US010766786B2

(12) United States Patent
Chen et al.

(10) Patent No.: US 10,766,786 B2
(45) Date of Patent: Sep. 8, 2020

(54) MO-DOPED CO₂Z-TYPE FERRITE COMPOSITE MATERIAL FOR USE ULTRA-HIGH FREQUENCY ANTENNAS

(71) Applicant: Northeastern University, Boston, MA (US)

(72) Inventors: Yajie Chen, Brighton, MA (US); Vincent Harris, Sharon, MA (US)

(73) Assignee: ROGERS CORPORATION, Rogers, CT (US)

(*) Notice: Subject to any disclaimer, the term of this patent is extended or adjusted under 35 U.S.C. 154(b) by 644 days.

(21) Appl. No.: 15/546,891

(22) PCT Filed: Feb. 1, 2016

(86) PCT No.: PCT/US2016/015888
§ 371 (c)(1),
(2) Date: Jul. 27, 2017

(87) PCT Pub. No.: WO2016/123598
PCT Pub. Date: Aug. 4, 2016

(65) Prior Publication Data
US 2018/0016157 A1    Jan. 18, 2018

Related U.S. Application Data

(60) Provisional application No. 62/110,025, filed on Jan. 30, 2015.

(51) Int. Cl.
*C04B 35/26* (2006.01)
*H01F 1/34* (2006.01)
(Continued)

(52) U.S. Cl.
CPC ........... *C01G 51/66* (2013.01); *C01G 39/006* (2013.01); *C01G 49/0036* (2013.01);
(Continued)

(58) Field of Classification Search
CPC .. C04B 35/2608; C04B 35/2633; H01F 1/348
See application file for complete search history.

(56) References Cited

U.S. PATENT DOCUMENTS 4,957,812 A    9/1990 Aoki et al.
5,593,612 A    1/1997 Lubitz
(Continued)

FOREIGN PATENT DOCUMENTS

CN    103304186 A    9/2013
CN    104193224 A    12/2014
(Continued)

OTHER PUBLICATIONS

Brando et al., "Microwave Electromagnetic Characteristics of New Substituted M-Hexaferrites BaFe12-2xAxMexO19 (A = Ru, Ir ; Me = Co, Zn)", Journal De Physique IV France, Mar. 1997.
(Continued)

*Primary Examiner* — Matthew E. Hoban
(74) *Attorney, Agent, or Firm* — Cantor Colburn LLP

(57) ABSTRACT

A Co₂Z hexaferrite composition is provided containing molybdenum and one or both of barium and strontium, having the formula $(Ba_2Sr_{(3-Z)}Co_{(2+X)})Mo_xFe_{(y-2x)}O_{41}$ where x=0.01 to 0.20; y=20 to 24; and z=0 to 3. The composition can exhibit high permeabilities and equal or substantially equal values of permeability and permittivity while retaining low magnetic and dielectric loss tangents and loss factors. The composition is suitable for high frequency applications such as ultrahigh frequency and microwave antennas and other devices.

52 Claims, 22 Drawing Sheets

(51) Int. Cl.

| | |
|---|---|
| *C01G 51/00* | (2006.01) |
| *C04B 35/626* | (2006.01) |
| *C04B 35/634* | (2006.01) |
| *H01B 1/02* | (2006.01) |
| *C01G 39/00* | (2006.01) |
| *C01G 49/00* | (2006.01) |
| *C04B 35/64* | (2006.01) |
| *H01F 27/255* | (2006.01) |
| *H01P 1/19* | (2006.01) |
| *H01P 1/20* | (2006.01) |
| *H01P 1/38* | (2006.01) |
| *H01Q 1/36* | (2006.01) |

(52) U.S. Cl.
CPC ...... *C04B 35/2633* (2013.01); *C04B 35/6261* (2013.01); *C04B 35/6262* (2013.01); *C04B 35/62675* (2013.01); *C04B 35/63416* (2013.01); *C04B 35/64* (2013.01); *H01B 1/02* (2013.01); *H01F 1/348* (2013.01); *H01F 27/255* (2013.01); *H01P 1/19* (2013.01); *H01P 1/20* (2013.01); *H01P 1/38* (2013.01); *C01P 2002/77* (2013.01); *C01P 2004/03* (2013.01); *C01P 2006/40* (2013.01); *C01P 2006/42* (2013.01); *C04B 2235/3213* (2013.01); *C04B 2235/3215* (2013.01); *C04B 2235/3256* (2013.01); *C04B 2235/3274* (2013.01); *C04B 2235/3275* (2013.01); *C04B 2235/3277* (2013.01); *C04B 2235/6567* (2013.01); *C04B 2235/6583* (2013.01); *C04B 2235/6585* (2013.01); *C04B 2235/6586* (2013.01); *C04B 2235/662* (2013.01); *C04B 2235/767* (2013.01); *C04B 2235/786* (2013.01); *C04B 2235/788* (2013.01); *C04B 2235/79* (2013.01); *H01Q 1/36* (2013.01)

(56) References Cited

U.S. PATENT DOCUMENTS

| | | | |
|---|---|---|---|
| 5,835,003 | A | 11/1998 | Nickel et al. |
| 6,358,432 | B1 | 3/2002 | Tomono et al. |
| 7,411,565 | B2 | 8/2008 | McKinzie, III et al. |
| 9,596,755 | B2 | 3/2017 | Sethumadhavan et al. |
| 2009/0266604 | A1 | 10/2009 | Tetsuji |
| 2009/0297432 | A1 | 12/2009 | Hill |
| 2010/0060539 | A1 | 3/2010 | Suetsuna et al. |
| 2013/0292602 | A1 | 11/2013 | Hill |
| 2013/0342414 | A1 | 12/2013 | Hong et al. |
| 2014/0176380 | A1 | 6/2014 | Choi et al. |
| 2016/0099498 | A1 | 4/2016 | Pance et al. |
| 2016/0113113 | A1 | 4/2016 | Sethumadhavan et al. |
| 2016/0276072 | A1 | 9/2016 | Sethumadhavan et al. |
| 2019/0013128 | A1 | 1/2019 | Chen et al. |
| 2019/0221343 | A1 | 7/2019 | Chen et al. |

FOREIGN PATENT DOCUMENTS

| | | |
|---|---|---|
| GB | 1105788 A | 3/1968 |
| JP | H09167703 | 6/1997 |
| WO | 2012103020 A2 | 8/2012 |
| WO | 2016064459 A1 | 4/2016 |

OTHER PUBLICATIONS

Lee et al. "Role of Small Permeability in Gigahertz Ferrite Antenna Performance," IEEE Magnetics Letter, 2013, vol. 4.

Martin et al.; "Flexible Magnetic Composites"; Passive RF Component Technoloby, Materials Techniques and Applications; Chapter 8; 2012; pp. 156-185.

Sharma et al.; "Ultra Low Loss Soft Magnetic Nanoparticles for Applications Up to S-band," Applied Physics Letters, vol. 103, 112402, Sep. 2013.

Wu et al.; "Studies of high-frequency magnetic permeability of rod-shaped $CrO_2$ nanoparticles"; Phys. Stat. Sol. (a) 204; No. 3; pp. 755-762; 2007.

Haijun et al., "The preparation and microwave properties of $Ba_3Znz$ $Co_{2-z}Fe_{24}O_{41}$ ferrite by citrate sol-gel process", Materials Science and Engineering, B84, 2001, pp. 252-257.

International Search Report for International Application No. PCT/US16/15888, International Filing Date Feb. 1, 2016, dated Jun. 10, 2016, 6 pages.

Mu et al., "Improvement of high-frequency characteristics of Z-type hexaferrite by dysprosium doping", Journal of Applied Physics, 109, 123925, 2011, 6 pages.

Written Opinion for International Application No. PCT/US16/15888, International Filing Date Feb. 1, 2016, dated Jun. 10, 2016, 8 pages.

Xu et al., "Structural, dielectric and magnetic properties of Nd-doped Co2Z-type hexaferrites", Jounal of Alloys and Compounds, 509, 2011, pp. 4290-4294.

Cao et al. "Hydrogen-Induced Lateral Growth of Nickel Coating on $Ba_3Co_2Fe_{24}O_4$ Co2Z-Based Hexaferrite during the Electroplating of Multilayer Chip Inductors," Journal of the Electrochemical Society, 2002, vol. 149 Issue 12, pp. J89-J92.

# MO-DOPED CO₂Z-TYPE FERRITE COMPOSITE MATERIAL FOR USE ULTRA-HIGH FREQUENCY ANTENNAS

CROSS REFERENCE TO RELATED APPLICATIONS

This application is a National Stage application of PCT/US16/015888, filed Feb. 1, 2016, which claims the benefit of U.S. Provisional Application No. 62/110,025, filed Jan. 30, 2015, both of which are incorporated by reference in their entirety herein.

BACKGROUND

Improved performance and miniaturization are needed to meet the ever-increasing demands of devices used in ultra-high frequency (UHF), L-band, and S-band applications, which are of particular interest in a variety of commercial and defense related industries. As a critical component in radar and modern wireless communication systems, antenna elements with compact size are constantly being developed. It has, however, been challenging to develop ferrite materials for use in such high frequency applications. Known ferrite materials exhibit relatively high magnetic losses at high frequencies, which have not met the need for the design of a practical antenna.

More generally, in modern wireless communication systems the demand for high performance devices of miniaturized structure is ever increasing. A material exhibiting high permeability with equivalent permittivity and having low magnetic and dielectric losses is ideal as an antenna substrate material. Such materials enable miniaturization, while concomitantly maintaining or enhancing antenna gain and bandwidth. Spinel ferrites with high permeability values, such as NiZn ferrites, have been widely used for high frequency applications. However, these ferrites exhibit relatively low cutoff frequencies that prevent their use above 0.3 GHz. Some hexaferrite materials, such as cobalt substituted barium Y-type (Co₂Y) and Z-type (Co₂Z) hexaferrites have much higher ferromagnetic resonance frequencies above 1.0 GHz due to their high magnetocrystalline anisotropy fields and high permeabilities. Accordingly, the use of magneto-dielectric substrates with values of the permittivity $\varepsilon'$ equivalent to the permeability $\mu'$ is popular due to the ease in impedance matching between substrate and free space among other benefits. However, it is very challenging to obtain low magnetic and dielectric losses and high permeability of the dielectric substrates. It has been reported that Co₂Y has $\varepsilon'$ of 15-20 and $\mu'$ of 2-3, while Co₂Z has $\varepsilon'$ of 12 and $\mu'$ of 18-19, but magnetic loss of the single phase Y- or Z-type ferrite is still considerably high (loss tangent, tan $\delta_\mu$>0.5) at f>0.5 GHz.

SUMMARY OF THE INVENTION

The invention relates to a hexaferrite composition useful as a magnetic material in electrical devices operating in the high frequency range. The hexaferrite composition comprises barium and/or strontium, molybdenum, cobalt, and iron and has a Z-type hexaferrite phase. The hexaferrite can be stoichiometric or non-stoichiometric. With substitutions of barium, strontium, and molybdenum as described herein, it is possible to provide magnetodielectric hexaferrite compositions of tunable permeability and permittivity and low dielectric and magnetic losses over high frequency ranges. The hexaferrite compositions can also be cost-effective for the mass production of devices such as microwave antenna substrates and in spintronics applications, such as giant magnetoresistant (GMR) devices. The invention also relates to methods of making the hexaferrite composition and articles, devices, or parts that comprise the hexaferrite composition.

Other aspects of the method and system include the following:

1. A hexaferrite composition comprising iron, cobalt, one or both of barium and strontium, and molybdenum, wherein said ferrite composition comprises a Z-type hexaferrite phase, having the formula $$(Ba_zSr_{(3-z)})Co_{(2+x)}Mo_xFe_{(y-2x)}O_{41}$$

where x=0.01 to 0.20;
y=20 to 24; and
z=0 to 3.

2. The hexaferrite composition of item 1, wherein x=0.08 to 0.15.
3. The hexaferrite composition of any of items 1-2, wherein x=0.10 to 0.12.
4. The hexaferrite composition of any of items 1-3, wherein the hexaferrite composition has a real permeability at least 3.0 over a frequency range of 0.1 to 3.0 GHz.
5. The hexaferrite composition of any of items 1-4, wherein the hexaferrite composition has a real permeability at least 7.0 over a frequency range of 0.1 to 3.0 GHz.
6. The hexaferrite composition of any of items 1-5, wherein the hexaferrite composition has a real permeability ranging from 7.0 to 12.0 over a frequency range of 0.1 to 3.0 GHz.
7. The hexaferrite composition of any of items 1-6, wherein z=1.2 to 3.0, and the hexaferrite composition has a real permeability ranging from 8.0 to 12.0 over a frequency range of about 0.1 GHz to at least 1.0 GHz.
8. The hexaferrite composition of any of items 1-7, wherein z=0 to 0.5, and the hexaferrite composition has a real permeability ranging from 2.0 to 4.0 over a frequency range of about 0.1 GHz to about 3.0 GHz.
9. The hexaferrite composition of any of items 1-8, wherein the hexaferrite composition has a real permittivity at least 6.0 over a frequency range of 0.1 to 3.0 GHz.
10. The hexaferrite composition of any of items 1-9, wherein the hexaferrite composition has a real permittivity at least 8.0 over a frequency range of 0.1 to 3.0 GHz.
11. The hexaferrite composition of any of items 1-10, wherein the hexaferrite composition has a real permittivity ranging from 6.0 to 18.0 over a frequency range of 0.1 to 10.0 GHz.
12. The hexaferrite composition of any of items 1-11, wherein a real permittivity of the hexaferrite composition is equal to a real permeability of the hexaferrite composition within 10%.
13. The hexaferrite composition of any of items 1-12, wherein the hexaferrite composition has a characteristic impedance matching an impedance of free space within 3%.
14. The hexaferrite composition of any of items 1-13, wherein the hexaferrite composition has a dielectric loss tangent, tan $\delta_\varepsilon$, less than 0.02 at a frequency of 0.1 to 0.8 GHz.
15. The hexaferrite composition of any of items 1-14, wherein the hexaferrite composition has a dielectric loss tangent, tan $\delta_\varepsilon$, less than 0.16 at a frequency of 0.1 to 1.0 GHz.

16. The hexaferrite composition of any of items 1-15 wherein the hexaferrite composition has a magnetic loss tangent tan $\delta_\mu$ approximately 0.1 at 0.4 GHz.
17. The hexaferrite composition of any of items 1-16, wherein the hexaferrite composition has a magnetic loss tangent tan $\delta_\mu$ less than 0.3 at a frequency of 0.1 to 0.8 GHz.
18. The hexaferrite composition of any of items 1-17, wherein the hexaferrite composition has a magnetic loss tangent tan $\delta_\mu$ less than 0.95 at a frequency of 0.1 to 3.5 GHz.
19. The hexaferrite composition of any of items 1-18, wherein the hexaferrite composition has a magnetic loss tangent, tan $\delta_\mu$, ranging from 0.1 to 1.0 over a frequency range of 0.1 to 1.0 GHz.
20. The hexaferrite composition of any of items 1-19, wherein the hexaferrite composition has a dielectric loss factor tan $\delta_\varepsilon/\varepsilon'$ less than 0.001 at a frequency of 0.8 GHz.
21. The hexaferrite composition of any of items 1-20, wherein the hexaferrite composition has a magnetic loss factor tan $\delta_{82}/\mu'$ less than 0.03 at a frequency of 0.8 GHz.
22. An article comprising the hexaferrite composition of any of items 1-21.
23. The article of item 22, wherein the article is an antenna, filter, inductor, circulator, or phase shifter.
24. The article of any of items 22-23, wherein the article is a microwave antenna.
25. The article of item 24, wherein the article is an antenna operable at a frequency equal to or greater than 0.1 GHz.
26. The article of any of items 24-25, wherein the article is an antenna operable at a frequency equal to or greater than 0.3 GHz.
27. The article of item 24, wherein the article is an antenna operable at 0.1 to 1.5 GHz.
28. The article of any of items 24 and 27, wherein the article is an antenna operable at 0.3 to 1.0 GHz.
29. The article of any of items 22-28, further comprising a second hexaferrite composition comprising a Z-type hexaferrite phase having the formula

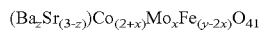

where x=0.01 to 0.20;
y=20 to 24; and
z=0 to 3; and
wherein the amount of Ba and the amount of Sr in the hexaferrite composition and the second hexaferrite composition differ.
30. The article of item 29, wherein a cutoff frequency of the second hexaferrite composition is higher than a cutoff frequency of the hexaferrite composition.
31. The article of any of items 29-30, wherein the hexaferrite composition has a real permeability ranging from 8.0 to 12.0 over a frequency range of about 0.1 GHz to at least 1.0 GHz, and the second hexaferrite composition has a real permeability ranging from 2.0 to 4.0 over a frequency range of about 0.1 GHz to about 3.0 GHz.
32. The article of item 22, wherein the article is a giant magnetoresistant device or a giant tunneling magnetoresistant device.
33. A method of making a hexaferrite composition comprising:
(a) providing hexaferrite phase precursor compounds comprising Fe, Ba, Co, and Mo,
(b) calcining the hexaferrite phase precursor compounds in air to form a material comprising a Z-type hexaferrite phase.

34. The method of item 33, wherein the hexaferrite phase precursor compounds comprise oxides of Fe, Ba, Co, and Mo.
35. The method of any of items 33-34, wherein the hexaferrite phase precursor compounds comprise $MoO_2$, $BaCO_3$, $Co_3O_4$, and $Fe_2O_3$.
36. The method of any of items 33-35, wherein the hexaferrite phase precursor compounds comprise 0 to 0.96 wt. % $MoO_2$, 22.10 to 22.18 wt. % $BaCO_3$, 6.02 to 6.59 wt. % $Co_3O_4$, and 70.35 to 71.8 wt. % $Fe_2O_3$.
37. The method of any of items 33-36, wherein in step (b), the precursor compounds are calcined at 1000 to 1300° C.
38. The method of any of items 33-37, further comprising:
(c) crushing the material formed in step (b) to form a powder mixture, and
(d) sintering the powder mixture.
39. The method of item 38, wherein the powder mixture is sintered at 1200 to 1280° C.
40. The method of any of items 38-39, wherein the powder mixture is sintered for 4 to 20 hours.
41. The method of any of items 38-40, wherein the powder mixture is sintered in an oxygen atmosphere.
42. The method of any of items 38-41, further comprising forming the powder mixture into a compact prior to step (d).
43. The method of any of items 38-42, further comprising adding a binder to the powder mixture.
44. The method of item 43, wherein the binder is selected from the group consisting of a polyvinyl alcohol, methyl cellulose, polyethylene glycol, and poly(alkylene carbonate).
45. The method of any of items 43-44, wherein the binder is polyvinyl alcohol comprising 8% to 12% by weight of the powder mixture.
46. The method of any of items 38-45, further comprising:
(e) crushing the material formed in step (d) to form a powder mixture; and
(f) annealing the powder mixture formed in step (e).
47. The method of item 46, wherein the powder mixture is annealed at 800 to 1000° C.
48. The method of any of items 46-47, wherein the powder mixture is annealed for 9 to 20 hours.

DESCRIPTION OF THE DRAWINGS

The invention will be more fully understood from the following detailed description taken in conjunction with the accompanying drawings in which.

DETAILED DESCRIPTION OF THE INVENTION

Figure 1A:
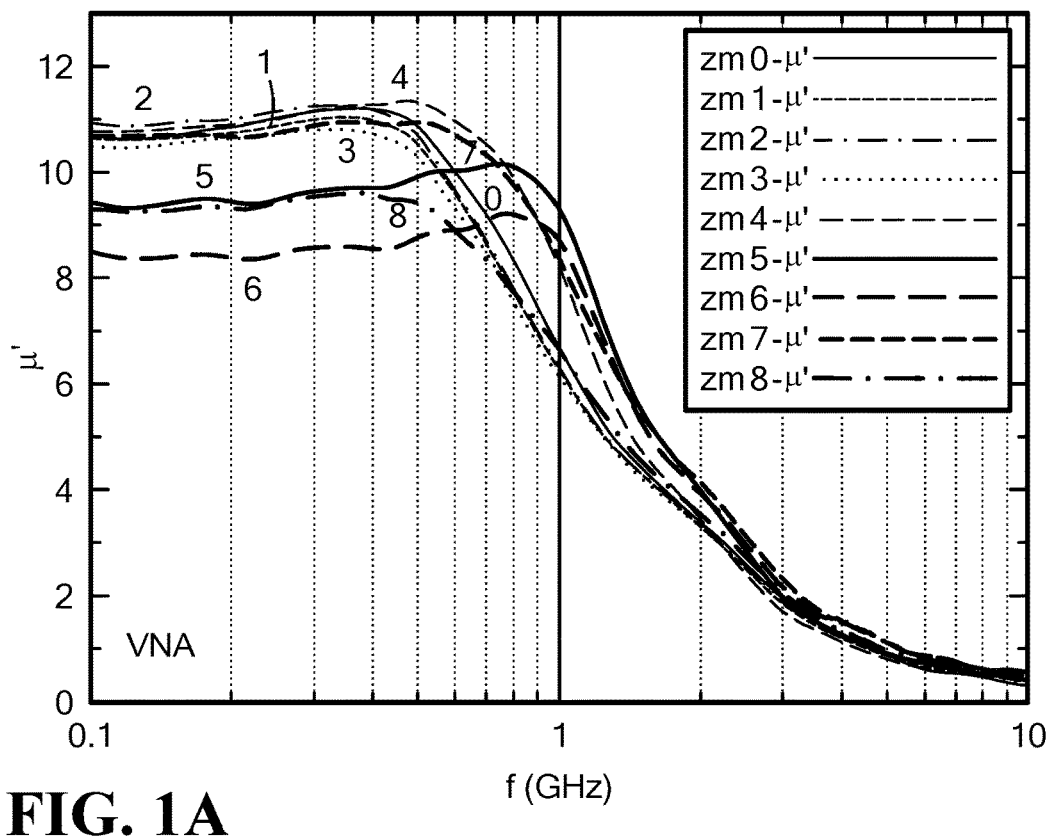
FIG. 1A is a graph of the frequency dependence of the real part of the permeability of Mo—$Co_2Z$.

The present invention relates to a Co$_2$Z-type hexaferrite composition in which the magnetic and dielectric losses can be controlled by the use of molybdenum (Mo) while retaining high permeability and/or low permittivity. The composition involves the substitution of Mo for iron (Fe) in Co$_2$Z-type hexaferrites. Molybdenum can successfully reduce magnetic loss and enhance permeability in both stoichiometric and non-stoichiometric strontium, barium, or strontium-barium Z-type hexaferrites. In some embodiments, MoO$_2$ can be used to reduce magnetic losses in Ba$_3$Co$_2$Fe$_{24}$O$_{41}$ hexaferrites (termed herein BaCo$_2$Z hexaferrites), and in other embodiments in Sr$_3$Co$_2$Fe$_{24}$O$_{41}$ hexaferrites (termed herein SrCo$_2$Z hexaferrites). In some embodiments, MoO$_2$ can be used to reduce magnetic losses in Co$_2$Z hexaferrites that include both Ba and Sr and/or non-stoichiometric amounts of Fe.

More generally, hexagonal ferrites, or hexaferrites, are a type of iron-oxide ceramic compound that has a hexagonal crystal structure and exhibits magnetic properties. Several types or families of hexaferrites are known, including Z-type ferrites, Ba$_3$Me$_2$Fe$_{24}$O$_{41}$, where Me can be a small 2+ cation such as Co, Ni, or Zn. Sr can be substituted for Ba. Other hexaferrite types include M-type hexaferrites ((Ba,Sr)Fe$_{12}$O$_{19}$), W-type hexaferrites ((Ba,Sr)Me$_2$Fe$_{16}$O$_{27}$), Y-type hexaferrites ((Ba,Sr)$_2$Me$_2$Fe$_{12}$O$_{22}$), X-type hexaferrites ((Ba,Sr)$_2$Me$_2$Fe$_{28}$O$_{46}$), and U-type hexaferrites ((Ba,Sr)$_4$Me$_2$Fe$_{36}$O$_{60}$).

Cobalt-substituted barium Z-type (Co$_2$Z) hexaferrites can exhibit high ferromagnetic resonance frequencies and permeabilities, although it has been challenging to design high frequency devices that have a relative permeability μ and relative permittivity ε of an equal or substantially equal value as well as low magnetic and dielectric loss tangents (tan δ$_μ$, tan δ$_ε$) and loss factors (tan δ$_μ$/μ, tan δ$_ε$/ε). (As used herein, the permeability and permittivity values are the relative permeability and the relative permittivity, respectively.) Schematic crystal structure diagrams of M-type phase, Y-type phase, and Z-type phase hexaferrites are illustrated in FIGS. 16A-16C. The hexaferrite compounds are made of R, S, and T layers or minor modifications of these layers. Some properties of the Y-type and Z-type hexaferrites are shown in Table 1.

TABLE 1

Some properties of Y-type and Z-type hexaferrites

|  | Co$_2$Y | Co$_2$Z |
| --- | --- | --- |
| Formula | Ba$_2$Co$_2$Fe$_{12}$O$_{22}$ | Ba$_3$Co$_2$Fe$_{24}$O$_{41}$ |
| Stacking Order | (TS)$_3$ | RSTSR*S*T*S* |
| C (Å) | 43.56 | 52.30 |
| 4πM$_s$ · G | 2300 | 3360 |
| μ$_i$ | 3-4 | 17 |
| H$_A$ (kOe) | 28 | 13 |
| K$_1$ + K$_2$ | −2.6 | −1.8 |
| f$_r$ · (GHz) | 3 | 1-2 |
| T$_c$ | 340 | 410 |
| ρ (g/cm$^3$) | 5.4 | 5.35 |

The present hexaferrite composition is suitable for operation in high frequency applications, and in particular ultra-high frequency (UHF) and microwave applications and devices, such as antennas, filters, inductors, and circulators operable in the ultrahigh and microwave frequency ranges. The ultrahigh frequency (UHF) range is 0.3 GHz to 3 GHz. The microwave frequency range is 0.3 GHz to 300 GHz. The hexaferrite composition is also suitable for use in spintronics applications, such as giant magnetoresistant (GMR) devices.

The present hexaferrite composition contains Fe, Co, Mo, and one or both of Ba and Sr, and has a Z-type hexaferrite phase. The hexaferrite composition has the formula:

$$(Ba_zSr_{(3-z)})Co_{(2+x)}Mo_xFe_{(y-2x)}O_{41}$$

where x=0.01 to 0.20;
y=20 to 24; and
z=0 to 3.
In some embodiments, x=0.08 to 0.15. In other embodiments, x=0.10 to 0.12.

In some embodiments, the composition exhibits high real permeability μ' at high frequencies:
Permeability at f=0.1 to 1 GHz: μ'>8;
Permeability at f=0.1 to 0.8 GHz: μ'>10.
Additionally, in some embodiments, the composition has high, equal or substantially equal values of ε' and μ' (approximately 8 to 9) at f=0.1 to 1 GHz. The composition exhibits low magnetic and dielectric losses and loss factors:
Loss at f=0.1 to 0.8 GHz: tan $δ_μ$<0.3 and tan $δ_ε$<0.01.
Loss factor at f=0.8 GHz: tan $δ_μ$/μ'<0.03 and tan $δ_ε$/ε'<0.001.

In some embodiments, a hexaferrite composition is a Mo-doped BaCo₂Z hexaferrite in which 1.2<z<3. In some embodiments, a hexaferrite composition is a Mo-doped BaCo₂Z hexaferrite in which z=3. In some embodiments, Mo-doped BaCo₂Z hexaferrites can have a real permeability ranging from 8.0 to 12.0 at frequencies of about 0.1 GHz to about 1.0 GHz. In some embodiments, the material can have a magnetic loss tangent ranging from 0.08 to 0.15 at f=0.3 GHz and a magnetic loss tangent ranging from 0.3 to 0.75 at f=0.8 GHz, at a Mo content of 0.08<x<0.15. In some embodiments, the material can have a real permittivity ranging from 8 to 13 over a range of f=0.1 to 10.0 GHz at a Mo content of 0.01<x<0.20. In some embodiments, the dielectric loss tangent can be less than 0.02 at f=0.1 to 10.0 GHz for a Mo content of 0.01<x<0.12.

A Mo-doped BaCo₂Z hexaferrite can be used for applications such as microwave antennas. The material can be used in conjunction with a second hexaferrite operable over a different frequency range, for example, a higher frequency range, to provide a single device with a greater frequency range of operation. In some embodiments, the second hexaferrite can be a Mo-doped SrCo₂Z hexaferrite.

In some embodiments, a hexaferrite composition is a Mo-doped SrCo₂Z hexaferrite in which 0.0<z<0.5. In some embodiments, a hexaferrite composition is a Mo-doped SrCo₂Z hexaferrite in which z=0.0. In some embodiments, Mo-doped SrCo₂Z hexaferrites can have a real permeability ranging from 2.0 to 4.0 over a frequency range of about 0.1 GHz to about 3.0 GHz. In some embodiments, Mo-doped SrCo₂Z hexaferrites can have a real permeability ranging from 2.7 to 4.1 at f=0.1 to 1.0 GHz. In some embodiments, the real permeability is greater than 3.6 at f=1.0 GHz and a Mo content 0.08<x<0.12. In some embodiments, the material can have a magnetic loss tangent ranging from 0.08 to 0.3 at f=0.1 to 1.0 GHz. In some embodiments, the magnetic loss tangent is less than 0.25 at f=1.0 GHz and a Mo content 0.08<x<0.12. In some embodiments, the material can have a real permittivity ranging from 12 to 18 over a range of f=0.1 to 10.0 GHz at a Mo content of 0.01<x<0.20. In some embodiments, the dielectric loss tangent can be less than 0.03 at f=1.0 GHz for a Mo content of 0.08<x<0.12.

A Mo-doped SrCo₂Z hexaferrite can be used for applications such as microwave antennas. The material can be used in conjunction with a second hexaferrite operable over a different frequency range for example, a lower frequency range, to provide a single device with a greater frequency range of operation. In some embodiments, the second hexaferrite can be a Mo-doped BaCo₂Z.

In some embodiments, a hexaferrite composition is a Mo-doped Co₂Z hexaferrite with Sr and Ba, in which z=1.5. In some embodiments, a Mo-doped hexaferrite composition with Sr and Ba can have a real permeability ranging from 7.5 to 9.0 at f=0.8 to 1.0 GHz. In some embodiments, a Mo-doped hexaferrite composition with Sr and Ba can have a magnetic loss tangent ranging from 0.7 to 0.2 at f=0.8 to 1.0 GHz. In some embodiments, a Mo-doped hexaferrite composition with Sr and Ba can have a real permittivity ranging from 6.6 to 8.7 at f=0.8 to 1.0 GHz. In some embodiments, a Mo-doped hexaferrite composition with Sr and Ba can have a dielectric loss tangent ranging from 0.0019 to 0.0028 at f=0.8 to 1.0 GHz.

In some embodiments, the Mo-doped hexaferrite composition has a real permeability ranging from about 2.0 to about 12.0 at frequencies of about 0.1 GHz to about 3 GHz or greater. In some embodiments, at frequencies ranging from 0.1 GHz to at least 3.0 GHz and in some embodiments at higher frequencies, the real permeability is at least 3.0, at least 5.0, at least 7.0, at least 8.0, at least 9.0, at least 10.0, at least 11.0, or at least 12.0.

In some embodiments, the hexaferrite composition has a real permittivity ranging from about 6.0 to about 18.0 at frequencies of about 0.1 GHz to about 10 GHz. In some embodiments, at frequencies ranging from 0.1 GHz to at least 3.0 GHz and in some embodiments at higher frequencies, the real permittivity is at least 6.0, at least 7.0, at least 8.0, at least 9.0, at least 10.0, at least 11.0, at least 12.0, at least 13.0, at least 14.0, at least 15.0, at least 16.0, or at least 17.0.

In some embodiments, the real permittivity is equal to a real permeability W of the hexaferrite composition to within 10%. In other embodiments, the real permittivity and real permeability can be equal to within 15%, within 5%, within 2%, or within 1%. The hexaferrite composition can have a characteristic impedance matching an impedance of free space within 3%. In other embodiments, the characteristic impedance can match the impedance of free space within 5%, within 2%, or within 1%.

In some embodiments, the magnetic loss tangent tan $δ_μ$, ranges from less than 0.1 to about 1.0 at frequencies less than about 3.0 GHz. In some embodiments, at frequencies less than about 0.4 GHz, the magnetic loss tangent is less than 0.3, or less than 0.1. In some embodiments, at frequencies less than about 0.8 GHz, the magnetic loss tangent is less than 0.75, less than 0.5, or less than 0.3. In some embodiments, at frequencies less than about 1.0 GHz, the magnetic loss tangent is less than 0.95, less than 0.6, or less than 0.3. In some embodiments, at frequencies less than about 3.0 GHz, the magnetic loss tangent is less than 2.4 or less than 0.9.

In some embodiments, the hexaferrite composition has a magnetic loss tangent tan $δ_μ$, approximately 0.1 at 0.4 GHz. In some embodiments, the hexaferrite composition has a magnetic loss tangent tan $δ_μ$ less than 0.3 at a frequency of 0.1 to 0.8 GHz. In some embodiments, the hexaferrite composition has a magnetic loss tangent tan $δ_μ$, less than 0.95 at a frequency of 0.1 to 3.5 GHz. In some embodiments, the hexaferrite composition has a magnetic loss tangent, tan $δ_μ$, ranging from 0.1 to 1.0 over a frequency range of 0.1 to 1.0 GHz.

In some embodiments, the dielectric loss tangent tan $δ_ε$ ranges from less than 0.01 to 0.16 at frequencies less than about 1.0 GHz and in other embodiments at frequencies less than about 10.0 GHz. At frequencies less than about 0.4

GHz, the dielectric loss tangent is less than 0.12 in some embodiments, less than 0.09 in other embodiments, or less than 0.02 in still other embodiments. At frequencies less than about 1.0 GHz, the dielectric loss tangent is less than 0.10 in some embodiments, less than 0.08 in other embodiments, or less than 0.02 in still other embodiments. At frequencies less than about 3.0 GHz, the dielectric loss tangent is less than 0.07 in some embodiments.

In some embodiments, the hexaferrite composition has a dielectric loss tangent, tan $\delta_\varepsilon$, less than 0.02 at a frequency of 0.1 to 0.8 GHz. In some embodiments, the hexaferrite composition has a dielectric loss tangent, tan $\delta_\varepsilon$, less than 0.16 at a frequency of 0.1 to 1.0 GHz.

The hexaferrite composition has a low dielectric loss factor and magnetic loss factor within the high frequency range. In some embodiments, the hexaferrite composition has a dielectric loss factor tan $\delta_\varepsilon/\varepsilon'$ less than 0.001 and a magnetic loss factor tan $\delta_\mu/\mu'$ less than 0.03 at a frequency of 0.8 GHz.

The hexaferrite composition can be fabricated in any suitable manner. In one embodiment, the hexaferrite composition can be fabricated by providing hexaferrite phase precursor compounds. Suitable precursor compounds can be, for example, oxides or carbonates of Mo, Ba and/or Sr, Co, and Fe. The precursor compounds are ground into small particle sizes and mixed, and then calcined in air to form a material comprising a Z-type hexaferrite phase. Grinding the materials into small sizes and mixing for a long time results in smaller particle sizes, which can aid in lowering the temperatures and energies needed to form the hexaferrite phases. The particle sizes can be reduced by successive rounds of grinding, mixing, and sintering with sieving after each stage to ensure the reduction of particle size. The time required to reduce particle size to a suitable range is a function of powder to ball mass ratio, ball and cylinder material, and solvent used (if any). A suitable particle size ranges from 0.1 μm to 100 μm, with tens of microns in effective diameter being typical. The material resulting after calcination can be ground to form a powder mixture that can be pressed and sintered to form a dense solid body. The resulting material can be ground and annealed in flowing oxygen gas to enhance phase oxygen stoichiometry that would improve magnetic properties.

In some embodiments, a mixture of $MoO_2$, $BaCO_3$, $SrCO_3$, $Co_3O_4$, and $Fe_2O_3$ is provided. The amounts can be mixed in proportion determined by the desired nominal stoichiometry. In some embodiments, the amounts can be 0 to 0.96 wt. % $MoO_2$, 22.10 to 22.18 wt. % $BaCO_3$, 6.02 to 6.59 wt. % $Co_3O_4$, and 70.35 to 71.8 wt. % $Fe_2O_3$.

The materials can be mixed with a solvent and ground in a ball mill or other suitable mixing device, such as, without limitation, a roller mix, a shaker mill, or a plenary mill, using a variety of ball and cylinder materials. In one embodiment, the materials are mixed in an agate jar at 400 rpm for 3 hours using a 4 station planetary ball mill. The materials are mixed in nominal ratios of oxides and carbonates to mixing balls to solvent: 1:(1-2):(1-2) wt. %. The solvent can be, for example and without limitation, water, including distilled water or deionized water, toluene, or an alcohol, including for example and without limitation, ethyl alcohol or a reagent grade alcohol (which in some embodiments, is 90% ethyl alcohol, 5% methyl alcohol, and 5% isopropyl alcohol). In some embodiments, no solvent need be used.

The resulting mixture can be dried at 200 to 300° C. for 3 to 10 hours in a convection oven and then pressed into a suitable form to increase its density. In one embodiment, the material can be uni-axially pressed to a 1-inch disk at 0.1 to 0.3 tonne/cm$^2$ in a die set. Higher pressures can be used, depending on the press used. The pressure can be selected to achieve a suitable densification after sintering. Typically a densification in excess of 90% after sintering is suitable.

The materials can be calcined in air to form the Z-type hexaferrite phase. In some embodiments, the materials can be calcined at 1000 to 1300° C. In some embodiments, the following calcination temperature profile can be used:

1) starting at an ambient temperature (e.g., ~20° C.), ramp to 1200° C.±100° C. over a period of 240 minutes±60 minutes;

2) dwell at 1200° C.±100° C. for a period of 300 minutes ±60 minutes;

3) allow the furnace to cool to ambient, for example, over a period of 240 minutes±60 minutes.

The resulting calcined ferrites can be crushed and passed through a #40 sieve to separate the particles by size. The smaller particles and a solvent (e.g., alcohol or water, as noted above) can be ground, for example, in a ball mill and dried. The resulting powder mixture can be pressed into a compact, with the addition of a binder to assist in maintaining the compact shape. In some embodiments, polyvinyl alcohol ranging from 8 to 12% by weight of the powder mixture can be used as the binder. Other suitable binders include methyl cellulose, polyethylene glycol, or poly(alkylene carbonate). The binder burns off during subsequent sintering.

The compact can be sintered in a furnace, such as a tube furnace, for a suitable time at a suitable temperature. In some embodiments, the compact can be sintered at 1200 to 1280° C. In some embodiments, the compact can be sintered for 4 to 20 hours. The compact can be sintered in an oxygen atmosphere in a tube furnace to help decrease dielectric loss. For example, $O_2$ gas can flow in at a rate of 0.5 to 2.0 L/min throughout the process. In some embodiments, the following sintering temperature profile can be used:

1) starting at an ambient temperature (e.g., ~20° C.), ramp up to 800° C.±100° C. over a period of 180 minutes±60 minutes;

2) ramp up to 1200° C.±100° C. over a period of 180 minutes±60 minutes;

3) dwell at 1200° C.±100° C. for a period of 240 minutes±60 minutes;

4) allow the furnace to cool to ambient, for example, over a period of 480 minutes±60 minutes.

The sintered hexaferrites can be crushed, sieved through a #100 sieve, ground with a solvent (as noted above), and dried. The resulting powder can be annealed in a flow of $O_2$ gas. In some embodiments, the resulting powder can be annealed at 800 to 1000° C. In some embodiments, the following annealing temperature profile can be used, with $O_2$ gas flowing at 0.2 to 2.0 L/min during the entire annealing process:

1) starting at an ambient temperature (e.g., ~20° C.), ramp up to 400° C.±100° C. over a period of 80 minutes±10 minutes;

2) ramp up to 900° C.±100° C. over a period of 200 minutes±100 minutes;

3) dwell at 900° C.±100° C. for a period of 240 minutes ±100 minutes;

4) allow the furnace to cool to ambient, for example, over a period of 360 minutes±100 minutes.

In other embodiments, the powder mixture can be formed by mechanisms such as tape casting or additive manufacturing prior to the sintering steps described herein.

The permeability, permittivity and resonance frequency of the $Co_2Z$ hexaferrites described herein can be tailored by substitution with Mo, Sr, and Ba ions. These Mo-doped $Co_2Z$ hexaferrites are accordingly desirable candidates for microwave magnetodielectric substrate materials operating at 0.3-10 GHz. The compositions can exhibit a high permeability ($\mu'>8$) over a high operating frequency (0.1 to 1 GHz and greater). Equal or substantially equal values of permeability and permittivity can be achieved, with both $\mu'$ and greater than 7 or, in some embodiments, greater than 8 at f=0.8 GHz, leading to matched impedance. The compositions can have low magnetic and dielectric loss factors, for example, of tan $\delta_\mu/\mu'$=0.03 and tan $\delta_\varepsilon/\varepsilon'$=0.001 at f=0.8 GHz. Material costs are low compared to, for example, Ir-doped hexaferrites.

The hexaferrite composition can be used for a variety of devices operable within the high frequency range, such as an ultra-high frequency or microwave antenna, filter, inductor, circulator, or phase shifter. In some embodiments, the device can be operable at frequencies greater than 0.1 GHz, in some embodiments at frequencies greater than 0.3 GHz, and in some embodiments at frequencies greater than 0.5 GHz. In some embodiments, the device can be operable at frequencies up to 1.0 GHz, up to 1.5 GHz, up to 3.0 GHz, or up to 10.0 GHz. For example, in some embodiments the device can be operable over a frequency range of 0.1 to 1.5 GHz. In some embodiments, the device can be operable over a frequency range of 0.3 to 1.0 GHz. In some embodiments, the device can be operable over a frequency range of 0.3 to 0.5 GHz. In some embodiments, the device can be operable over a frequency range of 0.5 to 1.0 GHz.

In some devices, two or more hexaferrite compositions can be employed, the hexaferrite compositions having different cutoff frequencies, to provide operation over a greater frequency range. For example, an antenna device can employ a Mo-doped $BaCo_2Z$ hexaferrite operable over a lower frequency range, such as 0.1 to 0.5 GHz, and a Mo-doped $SrCo_2Z$ hexaferrite operable over a higher frequency range, such as greater than 0.5 to 1.5 GHz.

Such devices can be used in commercial and military applications, weather radar, scientific communications, mobile and wireless communications, vehicles, aircraft communications, space communications, satellite communications, and surveillance.

The hexaferrite composition can be used in spintronics applications, such as giant magnetoresistant (GMR) devices and giant tunneling magnetoresistant (TMR) devices used in, for example, disk drive read heads and other data storage and memory devices and in magnetic sensors. Other spintronic applications include semiconductor devices, such as spin transistors and spin light emitting diodes.

EXAMPLE 1

Polycrystalline $Co_2Z$ hexaferrites, having the composition $Ba_3Co_2+xMo_xFe_{24-2x}O_{41}$, where x=0, 0.01, 0.02, 0.05, 0.08, 0.10, 0.12, 0.15 and 0.20, were prepared by a two-step ceramic process. Starting materials of $BaCO_3$, $MoO_2$, $Co_3O_4$, and $Fe_2O_3$ were calcined in air for 6 hours at 1000° C., and then crushed and ball milled. The mixture, comprising 90 v % ferrite fine powders and 10 v % polyvinyl alcohol (PVA) binder, was pressed into a toroid with an outer diameter of 7 mm, inner diameter of 3 mm, and width of about 2 mm. This sample size is adequate for microwave measurements. Since oxygen atmosphere can help decrease the dielectric loss, the hexaferrite samples were sintered at 1200 to 1280° C. for 4 to 20 hours in oxygen as a final process step. (An annealing step, typically used to establish oxygen stoichiometry, was not used due to the long, 20-hour, heat treatment step.) Eight samples, listed with a corresponding identifying code ZM0 to ZM8, correspond to the inclusion of Mo in the $Co_2Z$ hexaferrites as listed below.

TABLE 2

| Sample codes of $Ba_3Co_2 + xMo_xFe_{24-2x}O_{41}$ hexaferrites | | | | | | | | | |
|---|---|---|---|---|---|---|---|---|---|
| Mo (x) | 0 | 0.01 | 0.02 | 0.05 | 0.08 | 0.10 | 0.12 | 0.15 | 0.20 |
| Code | ZM0 | ZM1 | ZM2 | ZM3 | ZM4 | ZM5 | ZM6 | ZM7 | ZM8 |

Crystallographic structure was determined by X-ray diffraction (XRD, Philips X' pert PRO) measurements at room temperature in a θ-2θ geometry using CuKa radiation. The complex permittivity and permeability spectra were measured over a frequency range from 0.3-10 GHz by using an Agilent E864A 45 MHz-50 GHz PNA series vector network analyzer (VNA) with a 7 mm HP 85050C precision airline and Agilent Impedance Analyzer (IA) for a toroid sample at f=0.05 to 1.0 GHz. Morphology was scanned by scanning electron microscopy (SEM).

Results

1. Mo-Dependence of Permeability Spectra for Co2Z Hexaferrites

Figure 1B:
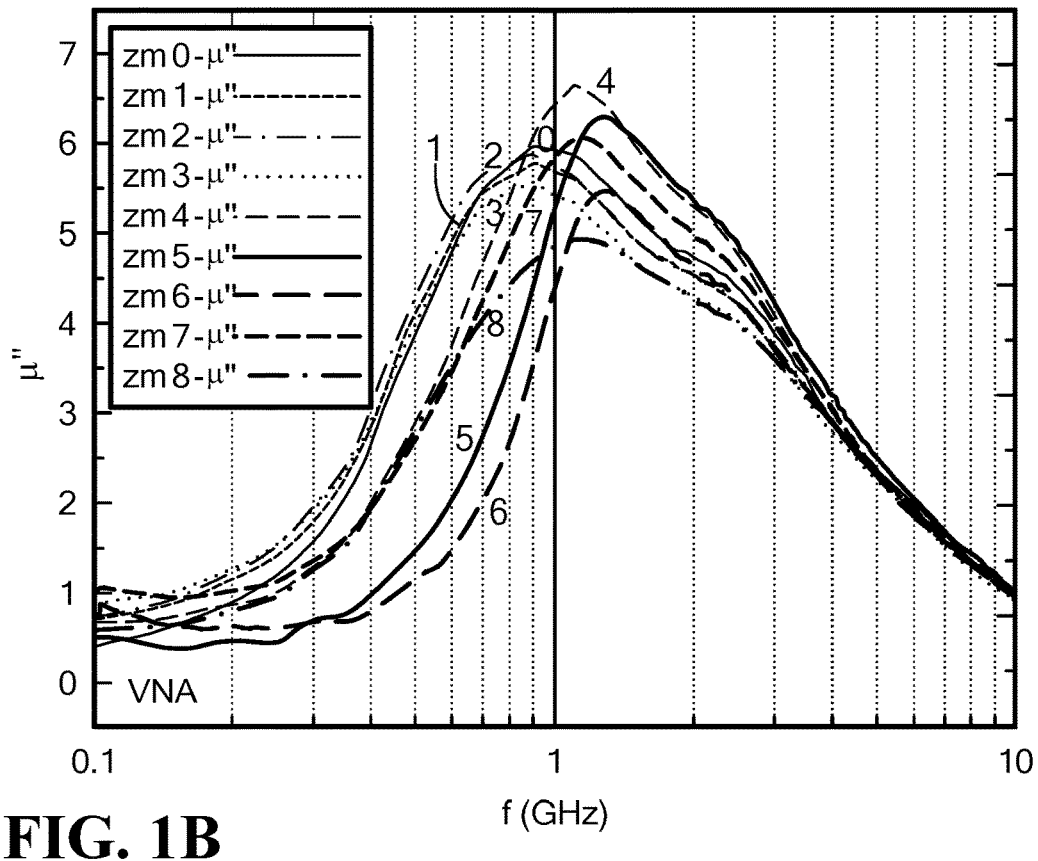
FIG. 1B is a graph of the frequency dependence of the imaginary part of the permeability of Mo—$Co_2Z$.

Changes in the real permeability with varying Mo ($Mo^{4+}$ ion) content (x) of $Co_2Z$ hexaferrite are depicted in FIG. 1A. This figure shows that as the molybdenum content increases (x>0.10), the permeability at low frequency decreases. The cutoff frequency (resonance frequency) increases beyond 1.0 GHz as x increases above 0.10, as shown in FIG. 1B.

Figure 2A:
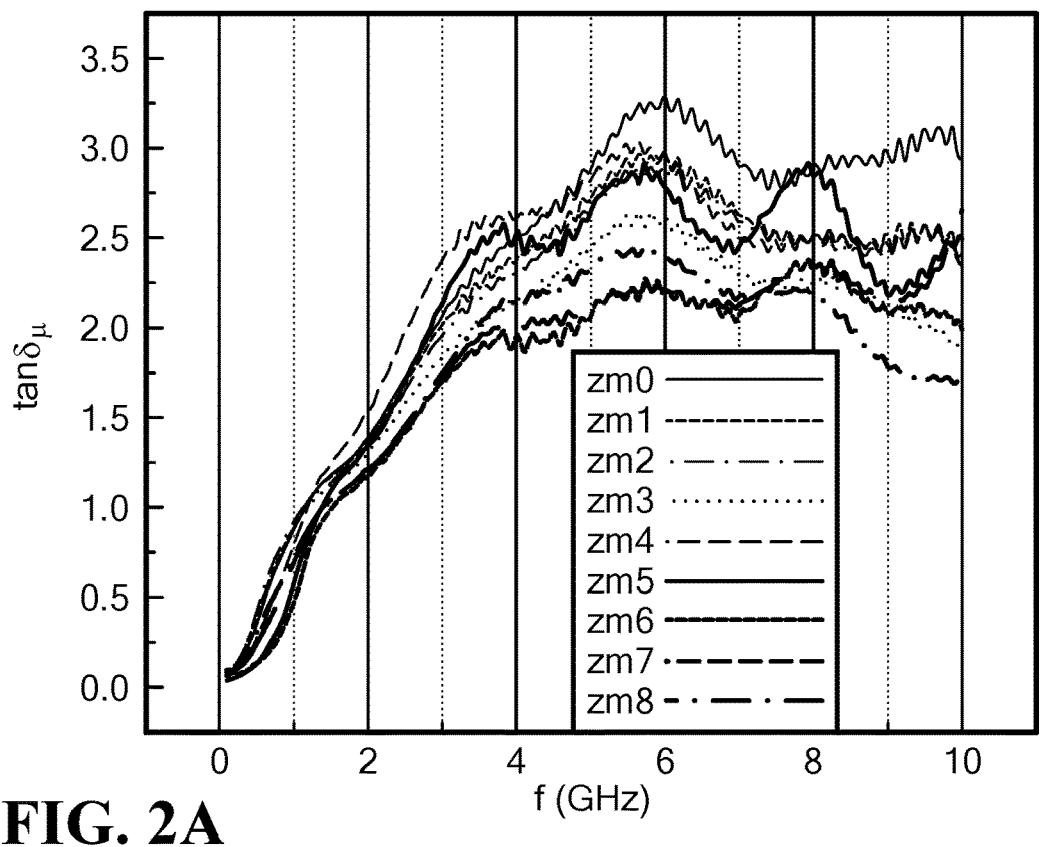
FIG. 2A is a graph of the frequency dependence of the magnetic loss tangent of the permeability of Mo—$Co_2Z$ hexaferrites at 0 to 10 GHz.
Figure 2B:
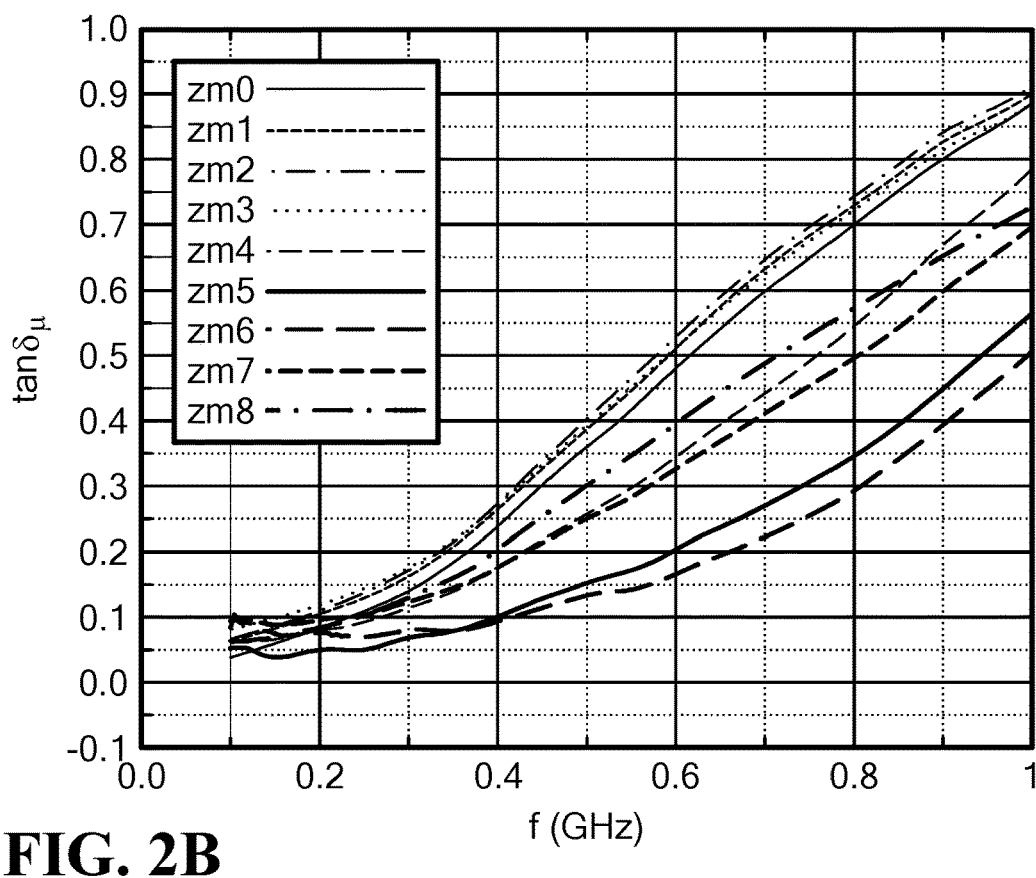
FIG. 2B is a graph of the frequency dependence of the magnetic loss tangent of the permeability of Mo—$Co_2Z$ hexaferrites at 0 to 1 GHz.

The magnetic loss tangent is less than 0.1 at f<0.4 GHz, and equal to 0.5 at f=1.0 GHz for x=0.12, as shown in FIGS. 2A and 2B. In particular, tan $\delta_\mu$ is less than 0.3 at f=0.8 GHz for x=0.12. The results indicate a high permeability of 8.5 to 10.

Figure 3A:
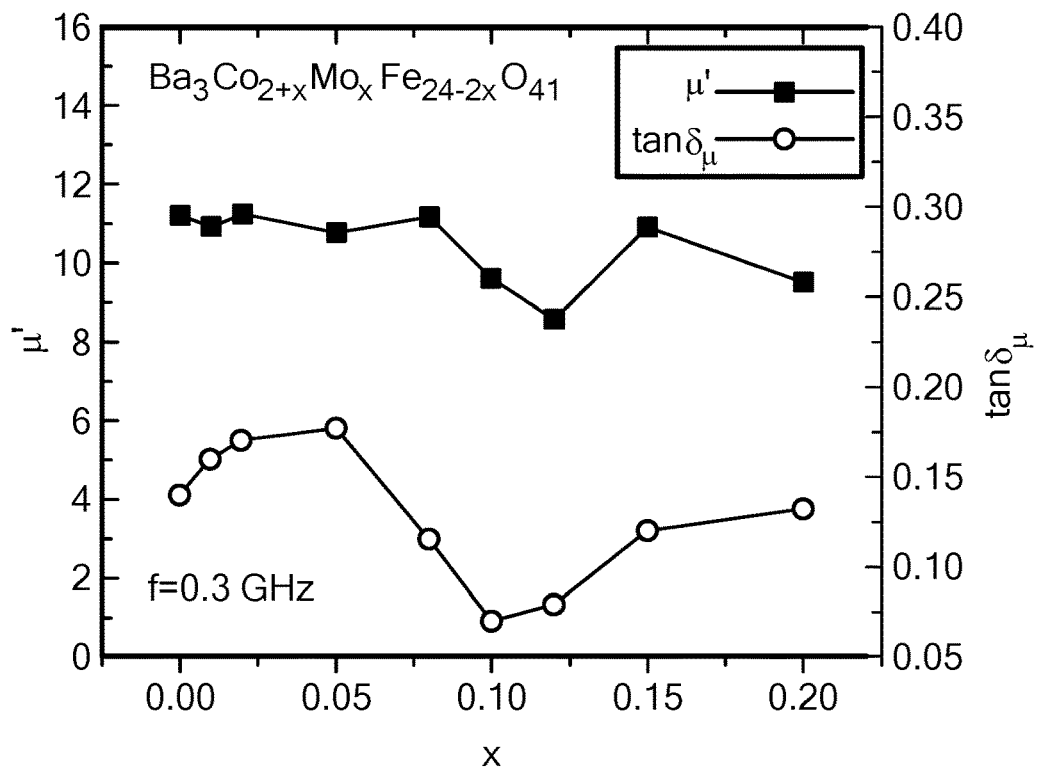
FIG. 3A is a graph of the variation of the permeability and magnetic loss tangent with Mo content at f=0.3 GHz for Mo—$Co_2Z$ hexaferrites.
Figure 3B:
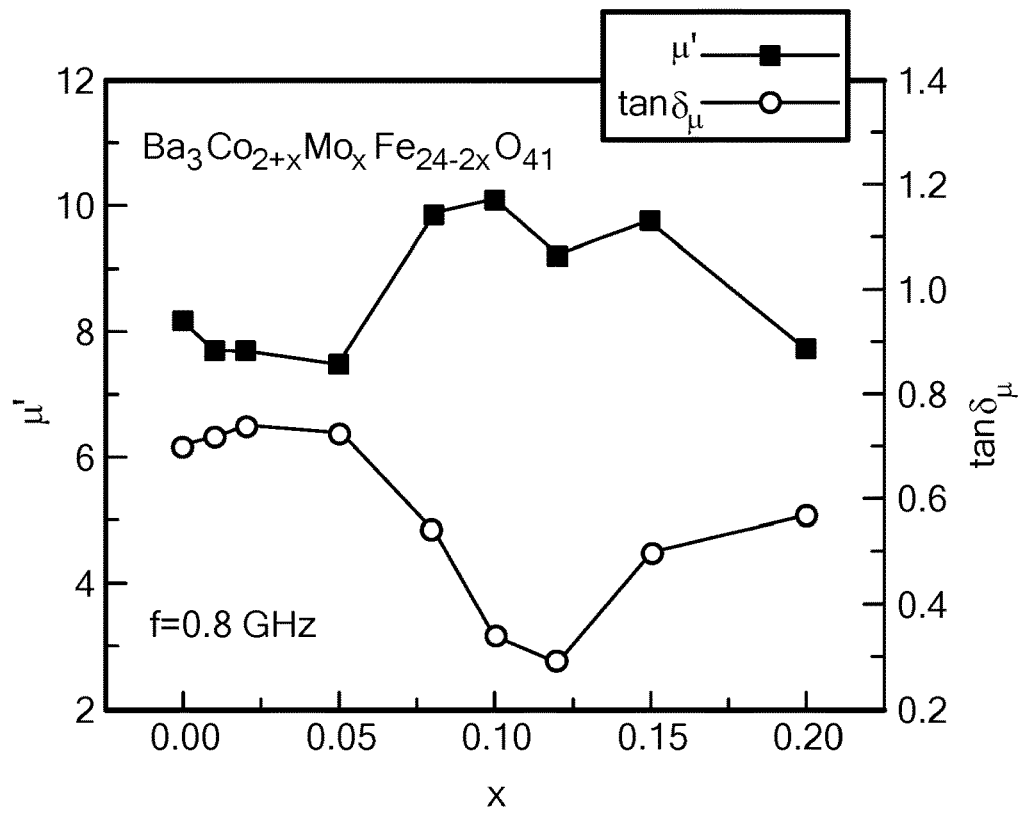
FIG. 3B is a graph of the variation of the permeability and magnetic loss tangent with Mo content at f=0.8 GHz for Mo—$Co_2Z$ hexaferrites.

FIGS. 3A and 3B present permeability and magnetic loss tangent as a function of the molybdenum content at a lower frequency (0.3 GHz) and a higher frequency (0.8 GHz). It is noteworthy that real permeability shows a dip as the molybdenum content ranges from x=0.08 to 0.15 at the lower frequency f=0.3 GHz, corresponding to a minimum in magnetic loss. In contrast, the real permeability at f=0.8 GHz rises to a peak for x=0.08 to 0.15. This increase in permeability also results in a significant decrease of magnetic loss that is similar to those observed at the lower frequency f=0.3 GHz. Thus, magnetic loss exhibits extremely low values as x ranges from 0.08 to 0.15, at either the lower or the higher frequency.

Figure 4A:
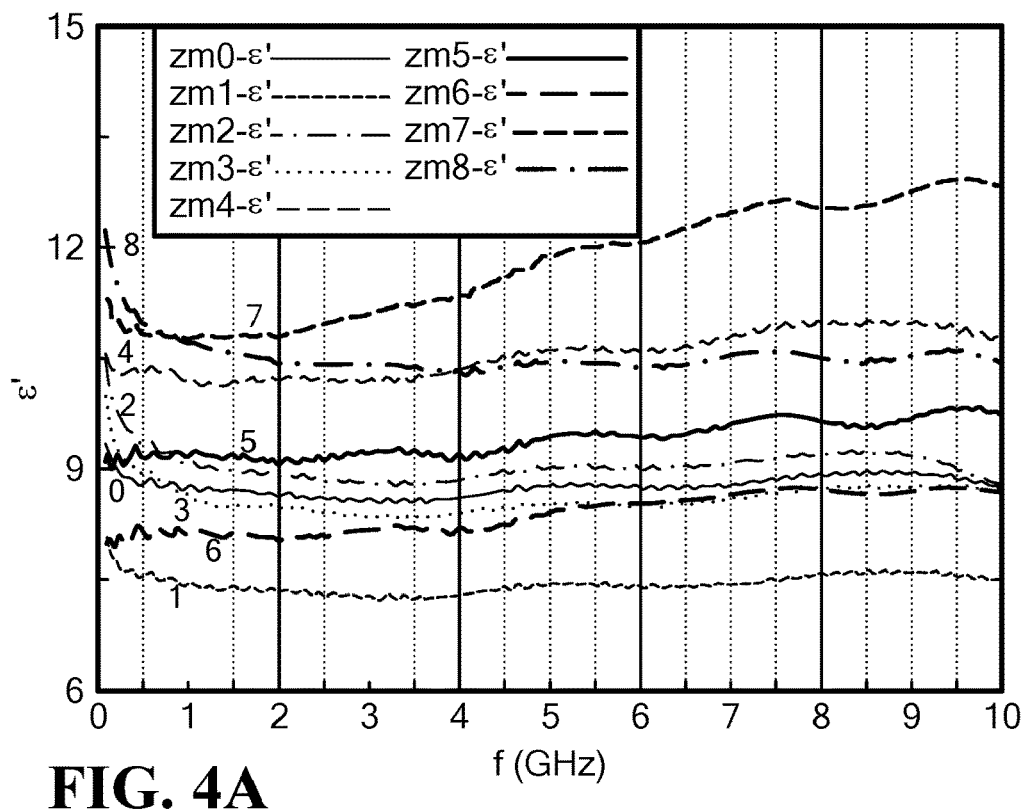
FIG. 4A is a graph of the frequency dependence of the real permittivity for Mo—$Co_2Z$ hexaferrite at 0 to 10 GHz.
Figure 4B:
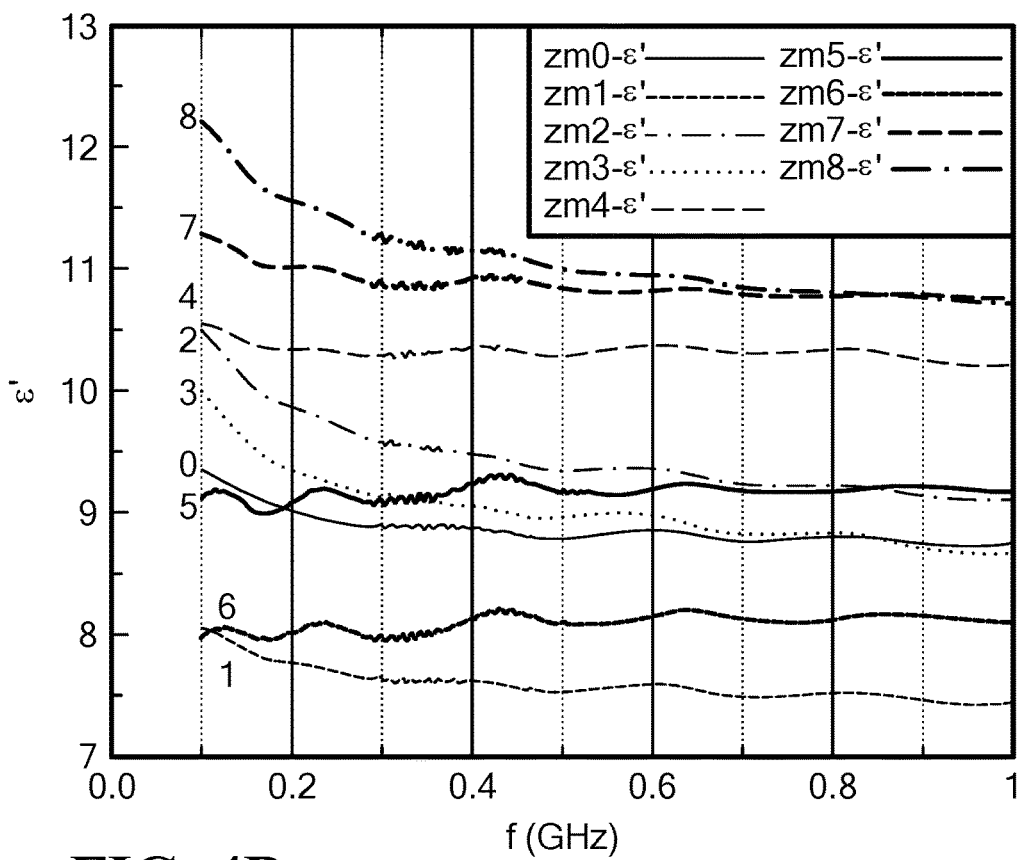
FIG. 4B is a graph of the frequency dependence of the real permittivity for Mo—Co$_2$Z hexaferrite at 0 to 1 GHz.

2. Mo-Dependence of Permittivity Spectra with Frequency for $Co_2Z$ Hexaferrites Real permittivity can be tailored to range from $\varepsilon'$=~7.5 to >12 with molybdenum content over a frequency range of 0.1 to 10.0 GHz as shown in FIG. 4A. The sample ZM6, with the lowest magnetic loss, indicates a small permittivity of ~8, as shown in FIG. 4B.

Figure 5A:
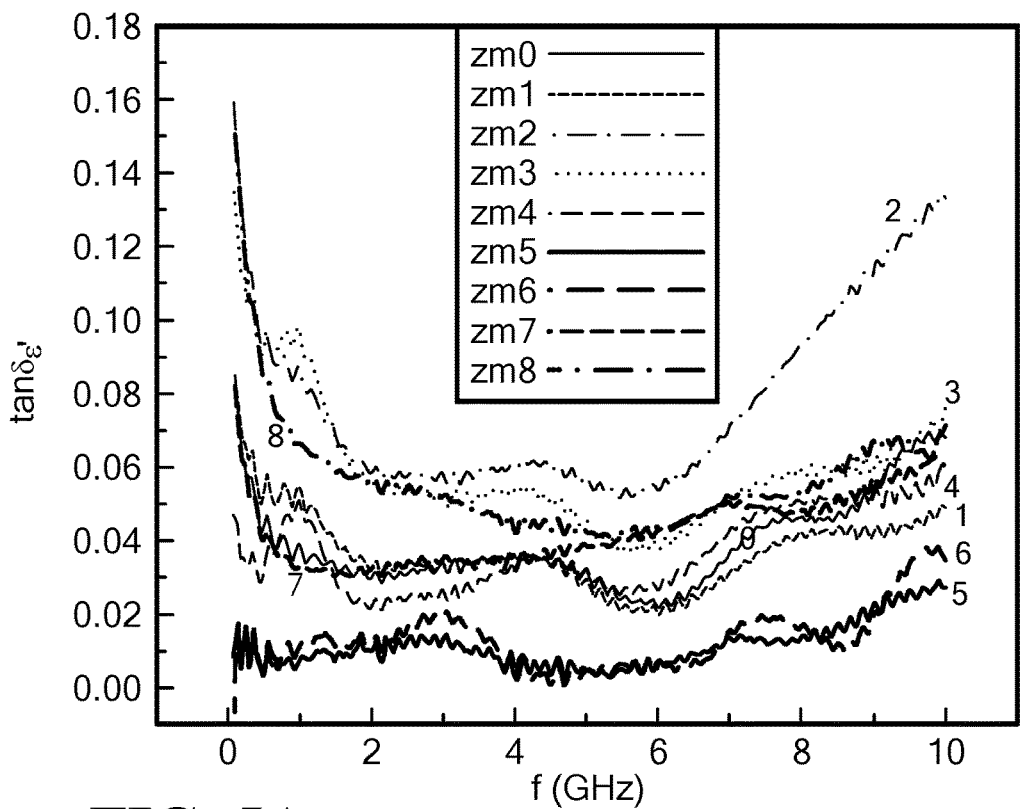
FIG. 5A is a graph of the frequency dependence of the dielectric loss tangent for Mo—Co$_2$Z hexaferrite at 0 to 10 GHz.
Figure 5B:
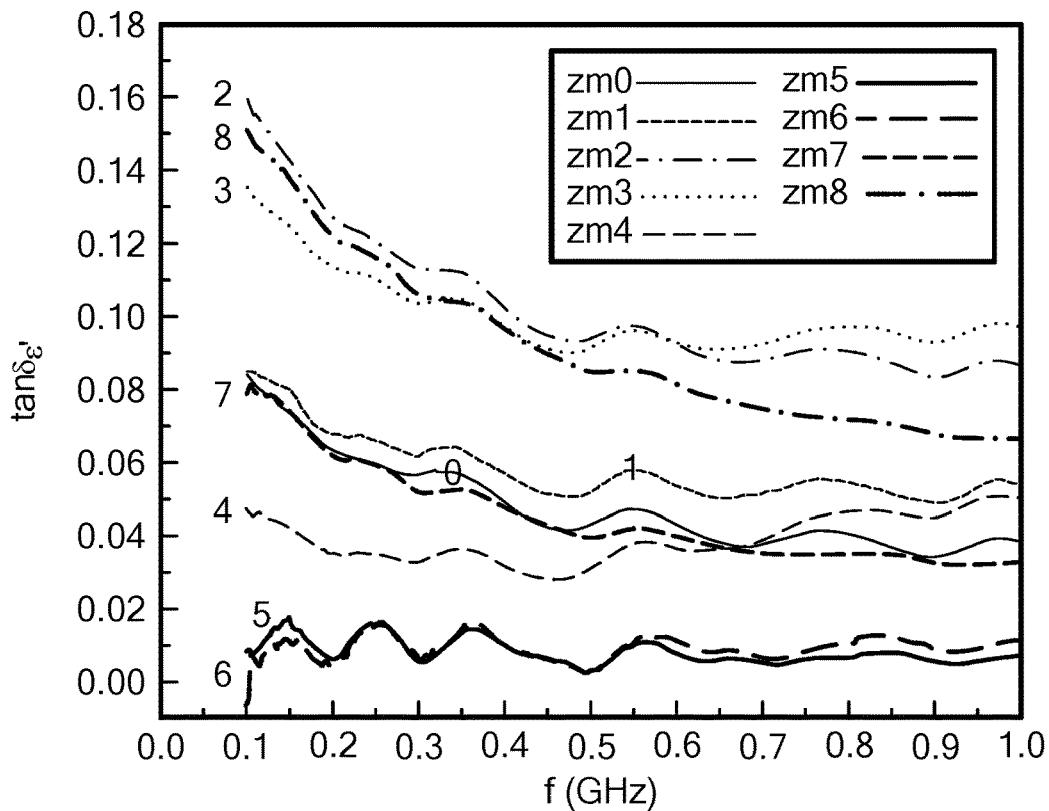
FIG. 5B is a graph of the frequency dependence of the dielectric loss tangent for Mo—Co$_2$Z hexaferrite at 0.0 to 1.0 GHz.

For the samples ZM5 (x=0.10) and ZM6 (x=0.12), the dielectric loss tangent remained very low, <0.02 over a wide frequency range of f=0.1 to 10.0 GHz, as shown in FIG. 5A. In particular, the dielectric loss tangent was below 0.01 for frequencies below 1.0 GHz for the samples ZM5 and ZM6, as shown in FIG. 5B.

Figure 6:
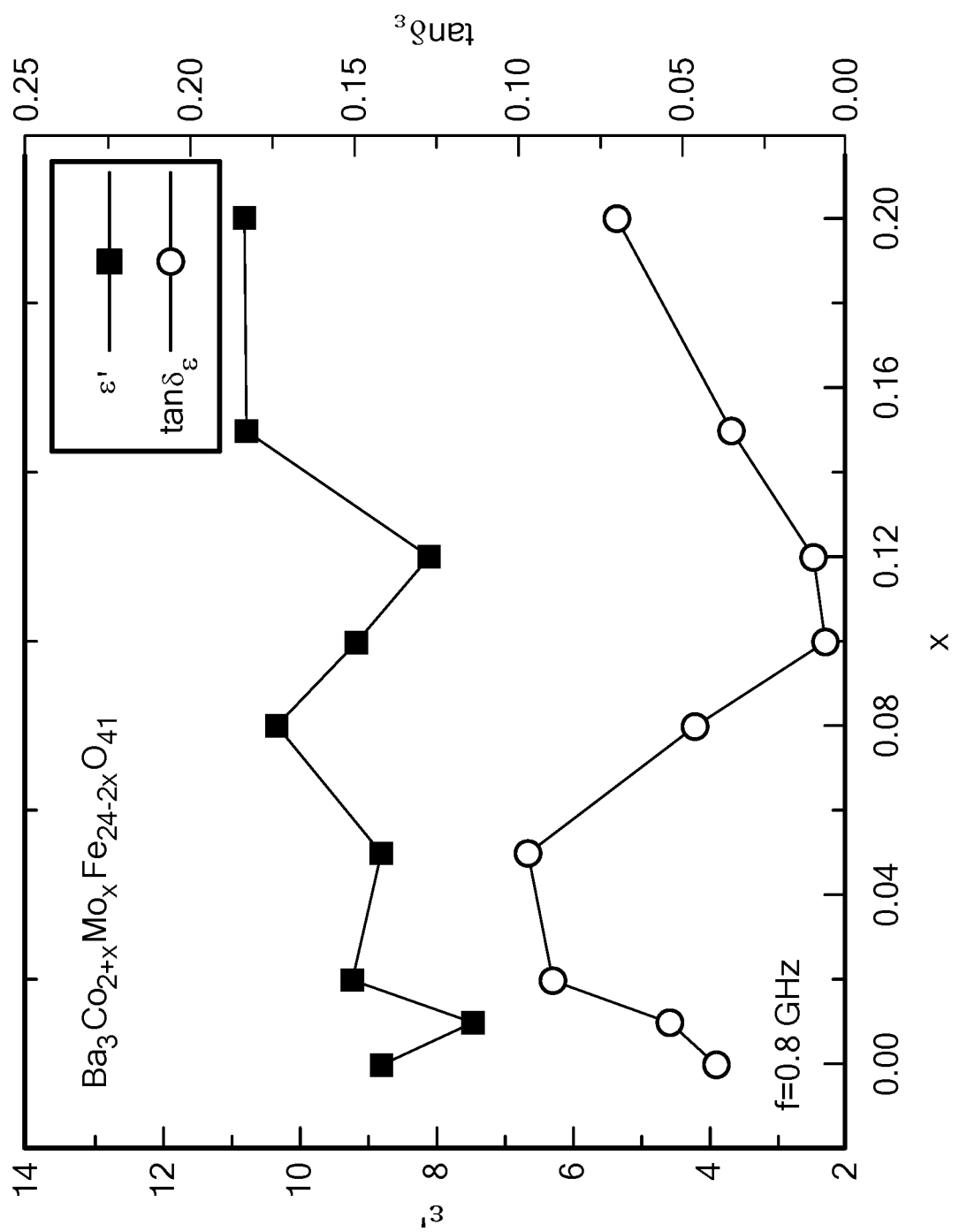
FIG. 6 is a graph of the variation of the permittivity and dielectric loss tangent with Mo content at 0.8 GHz for Mo—Co$_2$Z hexaferrite.

For x>0.05, the dielectric loss tangent decreases with molybdenum content at f=0.8 GHz, as shown in FIG. 6. At x=0.10 to 0.12, the lowest dielectric loss was measured, tan $\delta_\varepsilon$<0.01 at f=0.8

Figure 7A:
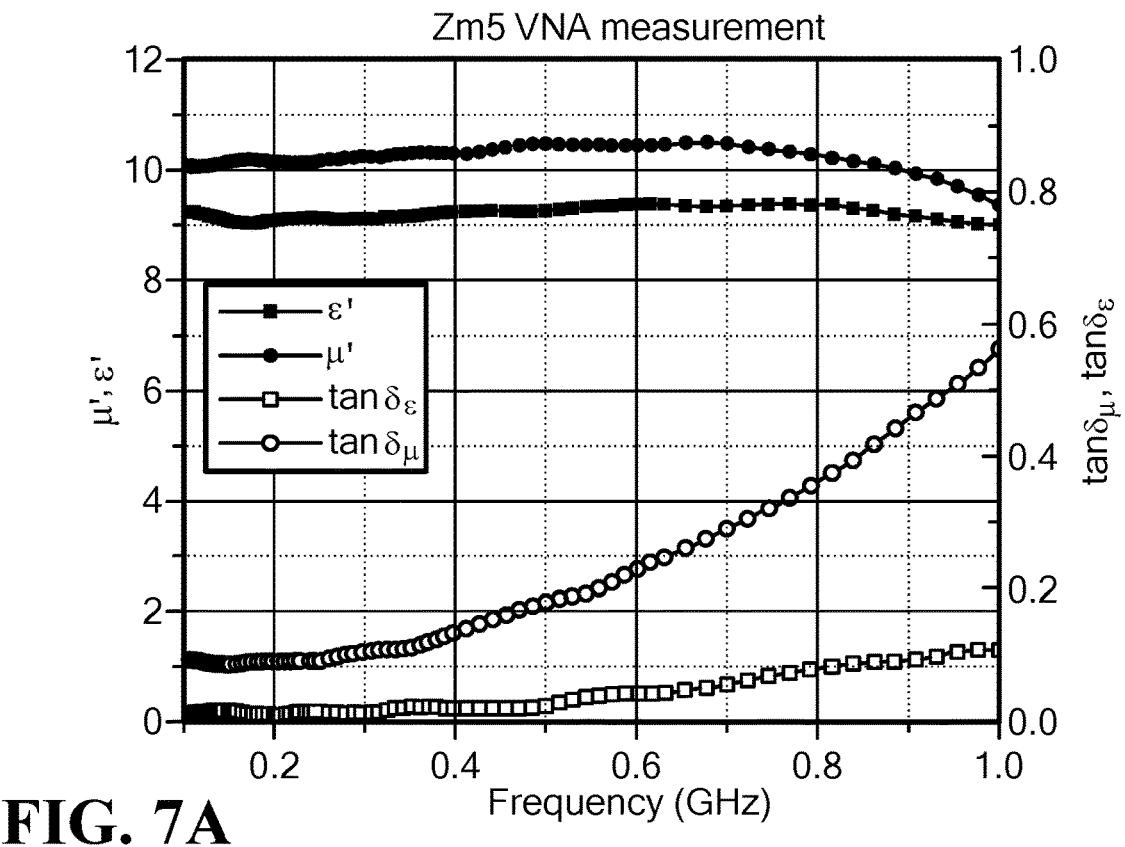
FIG. 7A is a graph of the frequency dependence of permeability, permittivity and magnet and dielectric loss tangent for Mo—Co$_2$Z hexaferrite ZM5, x=0.10.
Figure 7B:
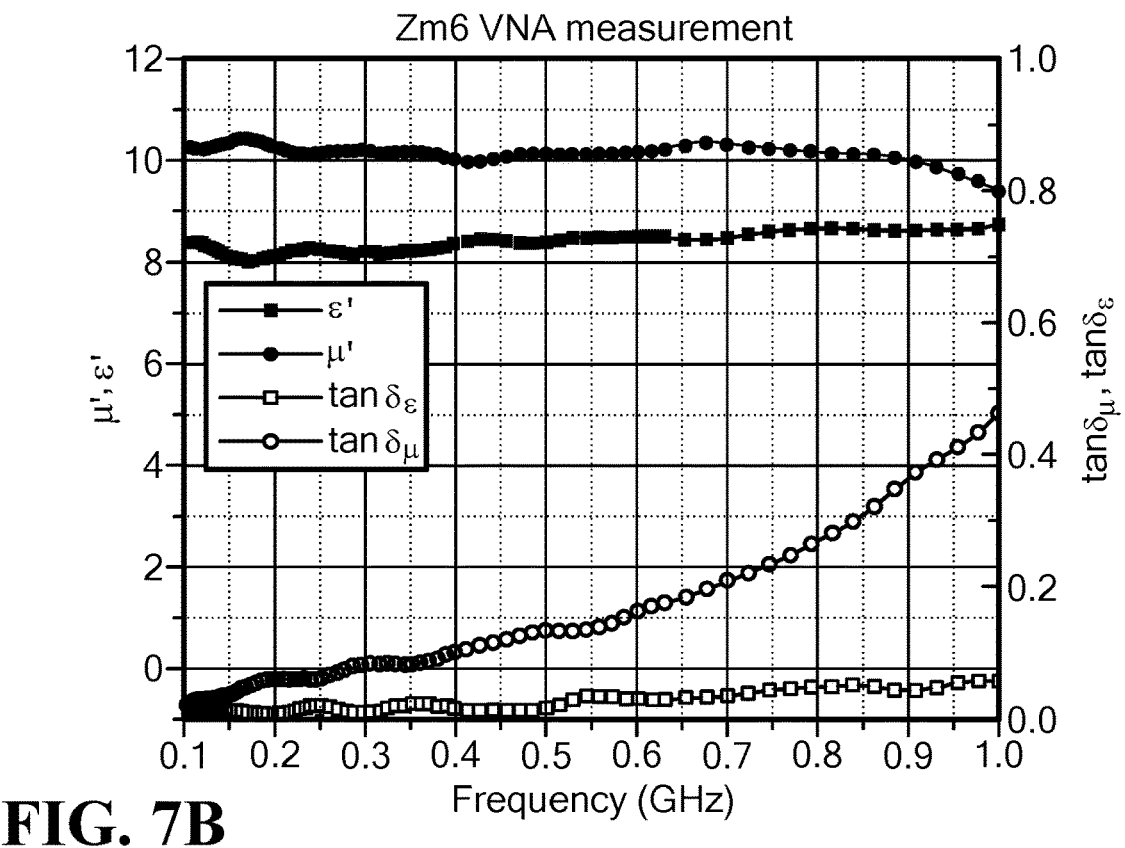
FIG. 7B is a graph of the frequency dependence of permeability, permittivity and magnet and dielectric loss tangent for Mo—Co$_2$Z hexaferrite ZM6, x=0.12.

3. Samples with High Permeability and low Magnetic and Dielectric Losses at f=0.1-1 GHz The frequency dependence of the permeability, permittivity and magnetic and dielectric loss tangents of the samples ZM5 and ZM6 is depicted in FIGS. 7A and 7B. At f<0.5 GHz, the magnetic loss tangent is less than 0.15, while the permeability is as high as 10 to 11. The lowest magnetic loss tangent is less than 0.27 at f=0.8 GHz for sample ZM6. Matched impedances can be obtained in terms of equal or substantially equal permeability and permittivity ($\varepsilon'$=9 (or 8), $\mu'$=10).

Figure 8:
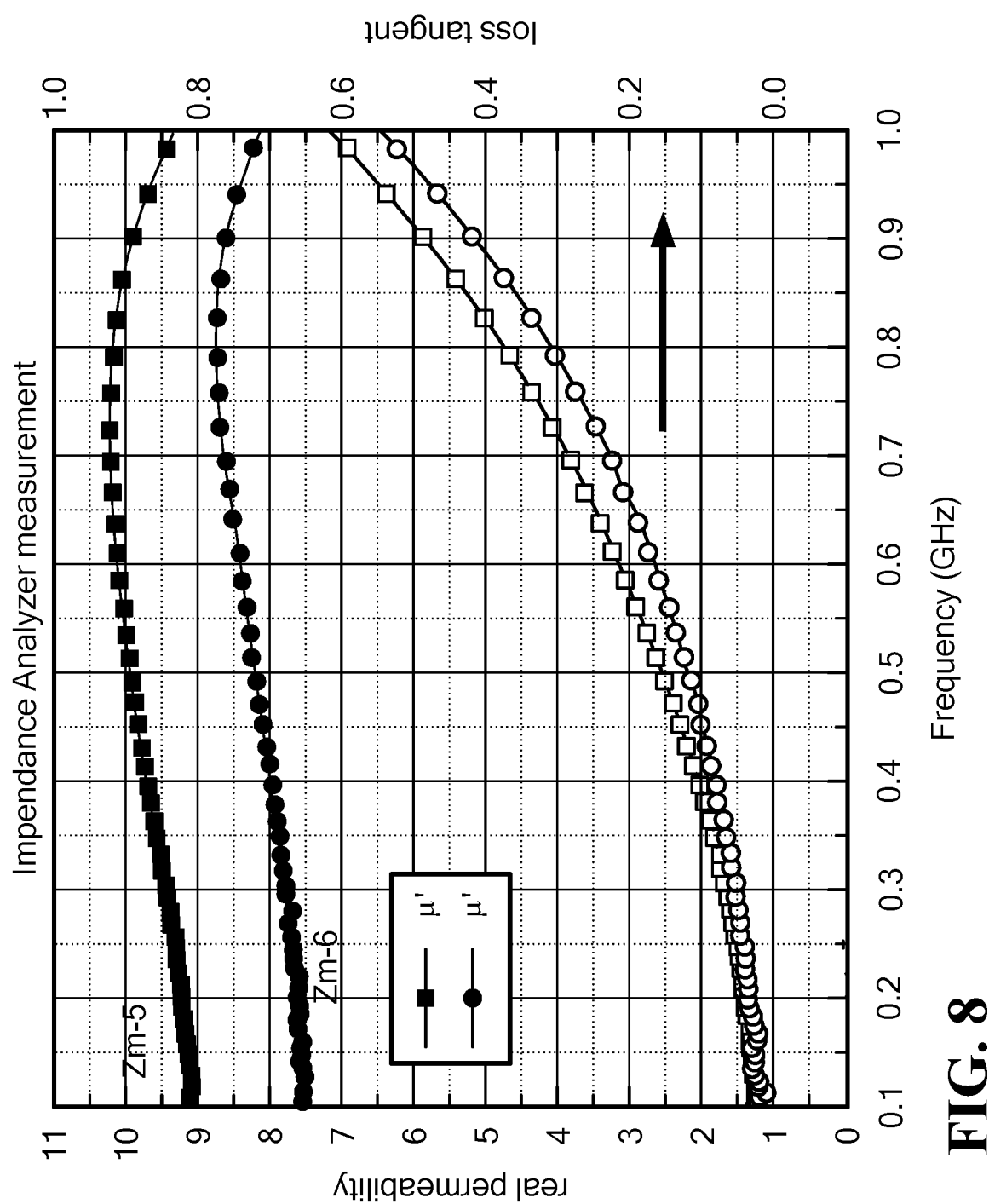
FIG. 8 is a graph of the frequency dependence of permeability, permittivity and magnetic and dielectric loss tangent for Mo—Co$_2$Z hexaferrites ZM5, x=0.10, and ZM6, x=0.12.

4. Measurement of Magnetic Spectra by Impedance Analyzer The magnetic spectra of the samples ZM5 and ZM6 were measured by the impedance analyzer over a frequency range from 0.1 to 1 GHz, as shown in FIG. 8. The results are in good agreement with those measured by the VNA, indicating a permeability of 8 to 11 and a magnetic loss tangent less than 0.3 at 0.8 GHz.

Table 3 lists major parameters measured by the VNA and IA, indicating a measuring error of less than 1% at 0.8 GHz.

TABLE 3

$\mu'$, and tan $\delta_\mu$ of sample ZM5 and ZM6 at different frequencies

| Sample | Measurement | $\mu'$ | tan $\delta_\mu$ |
|---|---|---|---|
| ZM5 | IA | 10.2 | 0.37 |
|  | VNA | 10.3 | 0.36 |
| ZM6 | IA | 8.8 | 0.30 |
|  | VNA | 9.2 | 0.29 |

5. SEM Morphology

Figure 9:
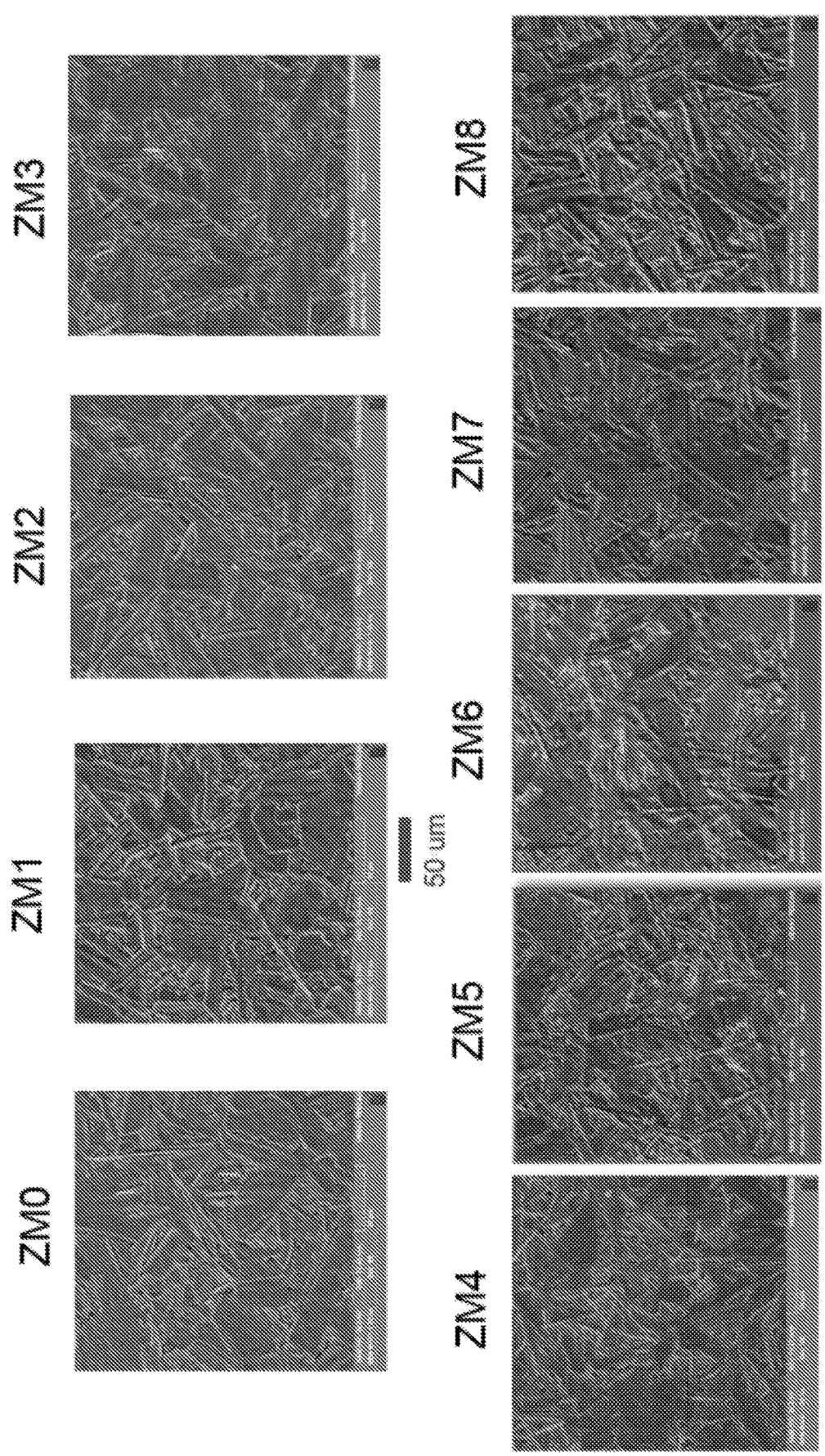
FIG. 9 is a series of SEMs illustrating surface morphology of Mo—Co$_2$Z hexaferrite samples with different Mo contents.

FIG. 9 shows SEM morphology of the Mo-doped $Co_2Z$ hexaferrite, indicating isotropic grain orientation and uniform grain distribution of grains that appear to be platelets in shape of large aspect ratio of 8-5:1. The average grain size is estimated to be around 60 to 80 μm along the long axes.

6. Comparison in Permeability, Permittivity, Loss Tangent and Grain Size with Existing Magnetodielectric Materials.

Table 4 presents a comparison of $\varepsilon'$, tan $\mu'$, tan $\delta_\varepsilon$ and tan $\delta_\mu$ for Mo-doped and Ir-doped $Co_2Z$ hexaferrites at 0.8 GHz with existing Ir-doped $Co_2Z$ hexaferrites. The Mo-doped $Co_2Z$ hexaferrites are the samples ZM5 and ZM6.

The Mo-doped $Co_2Z$ hexaferrites show enhanced permeability by 25 to 37%, compared to that of Ir-doped $Co_2Z$ hexaferrites. Also, the Mo-doped $Co_2Z$ hexaferrites reveal much lower dielectric loss tangents (<0.01), whereas Ir-doped $Co_2Z$ hexaferrite has a dielectric loss tangent of 0.07 at 0.8 GHz. The Mo-doped $Co_2Z$ hexaferrites show a magnetic loss tangent of 0.36, which is close to that of Ir-doped $Co_2Z$ hexaferrite, 0.25 to 0.30 at 0.8 GHz.

TABLE 4

Comparison of $\varepsilon'$, $\mu'$, tan $\delta_\varepsilon$ and tan $\delta_\mu$ for Mo-doped and Ir-doped $Co_2Z$ hexaferrites at 0.8 GHz.

| 0.8 GHz | $\mu'$ | tan $\delta_\mu$ | $\varepsilon'$ | tan $\delta_\varepsilon$ | Grain size (μm) |
|---|---|---|---|---|---|
| Mo_Zm5 | 10.3 | 0.36 | 9.36 | 0.007-0.01 | 60-80 |
| Mo_Zm6 | 9.2-10.2 | 0.27-0.29 | 8.64 | 0.04 | 60-80 |
| Ir_$Co_2Z$ | 7.44 | 0.25-0.30 | 8.14 | 0.07 | 200 |

In summary, polycrystalline hexaferrite compositions of nominal composition $Ba_3Co_{2+x}Mo_xFe_{24-2x}O_{41}$, where x=0 to 0.20, were prepared by ceramic processes. The results show that Mo-doped $Co_2Z$ polycrystalline hexaferrites have permeabilities, permittivities, and magnetic and dielectric losses that are superior to those of existing Ir-doped $Co_2Z$ hexaferrites over a wide frequency range of 0.1 to 5.0 GHz. The measured microwave dielectric and magnetic properties showed that the loss tan $\delta_\varepsilon$ and loss tan $\delta_\mu$ were decreased by 75% and 60% at 0.8 GHz with the addition of molybdenum having x=0.10 to 0.15, respectively, whereas the permeability was increased to 10.1 at 0.8 GHz, enhanced by 25%, in comparison to the Ir-doped $Co_2Z$ hexaferrites. Additionally, the Mo-doped $Co_2Z$ hexaferrites also demonstrate a substantially equivalent value of real permittivity and permeability (8 to 9) over the frequency range of 0.1 to 1.0 GHz to make the characteristic impedance the same as that of the free space impedance. Notably, the Mo-doped $Co_2Z$ hexaferrites not only give rise to the lowest loss factors (tan $\delta_\varepsilon/\varepsilon'$<0.00075 and tan $\delta_\mu/\mu'$<0.029) among those reported previously, but also have low material cost. The material cost of Mo-doped $Co_2Z$ hexaferrite can be one third of that of Ir-doped $Co_2Z$ hexaferrite. These properties make these hexaferrites suitable for applications in microwave devices at ultra-high frequency (UHF), such as miniature antennas.

EXAMPLE 2

Polycrystalline hexaferrites having a non-stoichiometric composition with the formula $(Ba_zSr_{(3-z)})Co_{(2+x)}Mo_xFe_{(y-2x)}O_{41}$ were produced. Table 5 lists the non-stoichiometric formulas for several samples that were prepared and tested.

TABLE 5

Formula design (non-stoichiometric formula)

| Code | Formula | Mo content, x |
|---|---|---|
| ZSF1 | $Ba_3Co_{(2+x)}Fe_{(21.6-2x)}Mo_xO_{41}$ | x = 0.12 |
| ZSF2 | $Ba_3Co_{(2+x)}Fe_{(22.4-2x)}Mo_xO_{41}$ | x = 0.12 |
| ZSF3 | $Ba_{1.5}Sr_{1.5}Co_{(2+x)}Fe_{(21.6-2x)}Mo_xO_{41}$ | x = 0.12 |
| ZSF4 | $Ba_{1.5}Sr_{1.5}Co_{(2+x)}Fe_{(22.4-2x)}Mo_xO_{41}$ | x = 0.12 |

The fabrication process began with the following raw materials and their purities: $BaCO_3$ (99.95%), $SrCO_3$ (99.95%), $Co_3O_4$ (99.7%), $MoO_2$ (99%), and $Fe_2O_3$ (99.95%). The ratio of each was selected to be consistent with the targeted nominal compositions. For example, the hexaferrite phase precursor compounds can comprise 0 to 0.96 wt. % $MoO_2$, 22.10-22.18 wt. % $BaCO_3$, 6.02-6.59 wt. % $Co_3O_4$, and 70.35-71.8 wt. % $Fe_2O_3$.

The materials were mixed with reagent alcohol as a solvent and ground in an agate jar and ball mixer at 400 rpm for 3 to 10 hours using a 4-station planetary ball mill. The mixture was dried at 200 to 300° C. for 3 to 10 hours in a convection oven and pressed to a 1-inch disk at 0.1 to 0.3 T/$cm^2$ in a die-set. The disk was calcined in air to form the Z-type hexaferrite phase according to the following temperature profile: 1) ramp up over 240 minutes to 1200° C.; 2) dwell for 300 minutes at 1200° C.; 3) cool over 240 minutes to 20° C.

The material was then crushed and sieved through a #40 sieve. The smaller particles passing through the sieve were ground with a reagent alcohol solvent in an agate jar and ball mixer at 400 rpm for 4 to 20 hours using a 4-station planetary ball mill. The mixture was dried at 200 to 300° C.

for 3 to 10 hours in a convection oven and pressed to a 1-inch disk at 0.5 to 2.0 T/cm². The disk was sintered according to the following temperature profile: 1) ramp up over 180 minutes to 800° C. with $O_2$ gas at a flow rate of 0.7 L/min; 2) ramp up over 180 minutes to 1200° C.; 3) dwell for 240 minutes at 1200° C.; 4) cool over 480 minutes to 20° C. with $O_2$ gas flowing.

The sintered material was then crushed and sieved through a #100 sieve. The crushed material passing through the sieve was ground with a reagent alcohol solvent in an agate jar and ball mixer at 400 rpm for 4 to 20 hours using a 4-station planetary ball mill. The resulting powder was dried at 200 to 300° C. for 3 to 10 hours in a convection oven. The powder was annealed according to the following temperature profile, with $O_2$ gas flowing the entire time: 1) ramp up over 80 minutes to 400° C.; 2) ramp up over 200 minutes to 900° C.; 3) dwell for 240 minutes at 900° C.; 4) cool over 360 minutes to 20° C.

Figure 10:
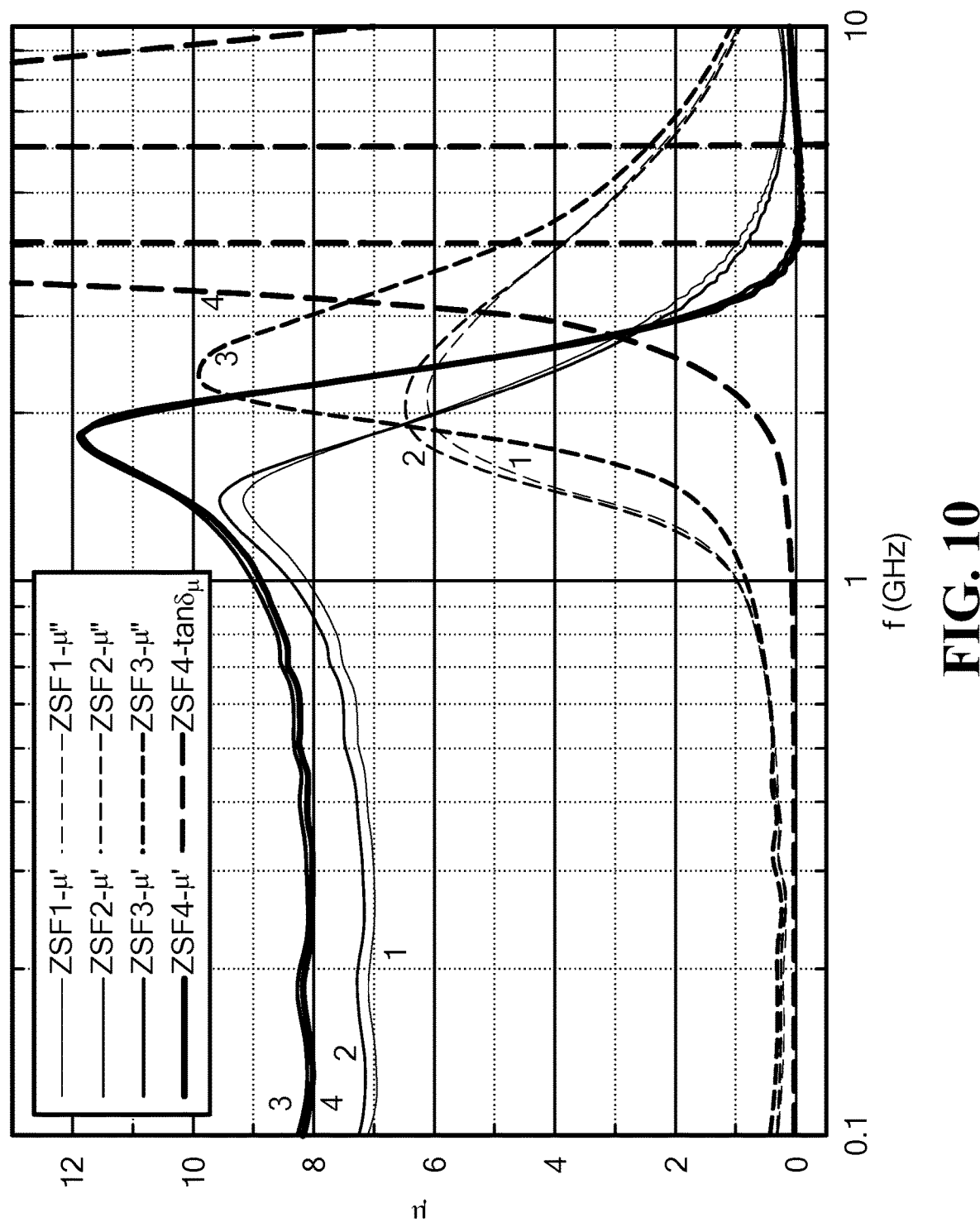
FIG. 10 is a graph of the frequency dependence of the magnetic permeability for ZSF series hexaferrite samples.

FIG. 10 illustrates the magnetic permeability vs. frequency for this ZSF series of hexaferrite samples. The permeability μ' was around 8 for SrBa—$Co_2Z$ hexaferrite (samples ZSF3 and ZSF4) and around 7 for Ba—$Co_2Z$ hexaferrite (samples ZSF1 and ZSF2), respectively at frequencies less than 1.0 GHz. The inclusion of Sr enhanced the permeability significantly. The magnetic loss tangent remained low with a value of 0.03 to 0.1 over a frequency range of 0.1 to 1.0 GHz. The Mo—SrBa hexaferrites (ZSF3 and ZSF4) had a high cutoff frequency ($f_r$) as well as permeability.

Figure 11A:
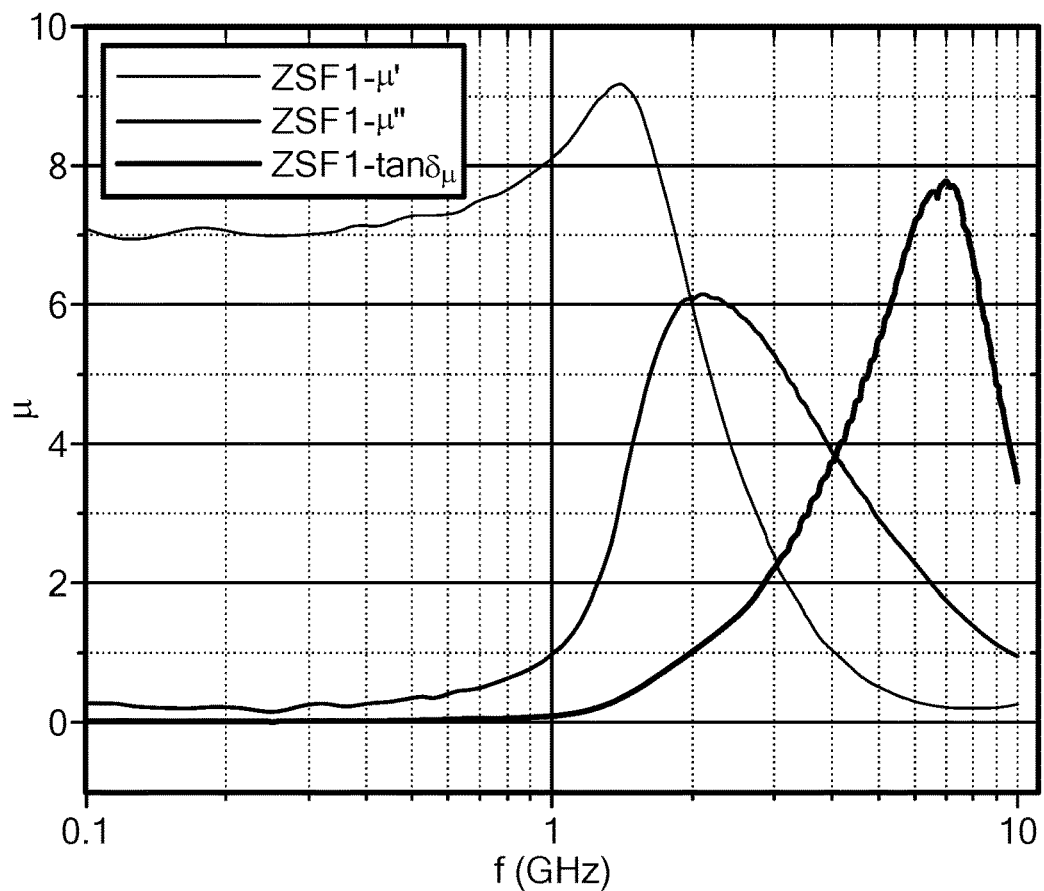
FIG. 11A is a graph of the frequency dependence of the magnetic permeability and loss for the sample ZSF1.
Figure 11B:
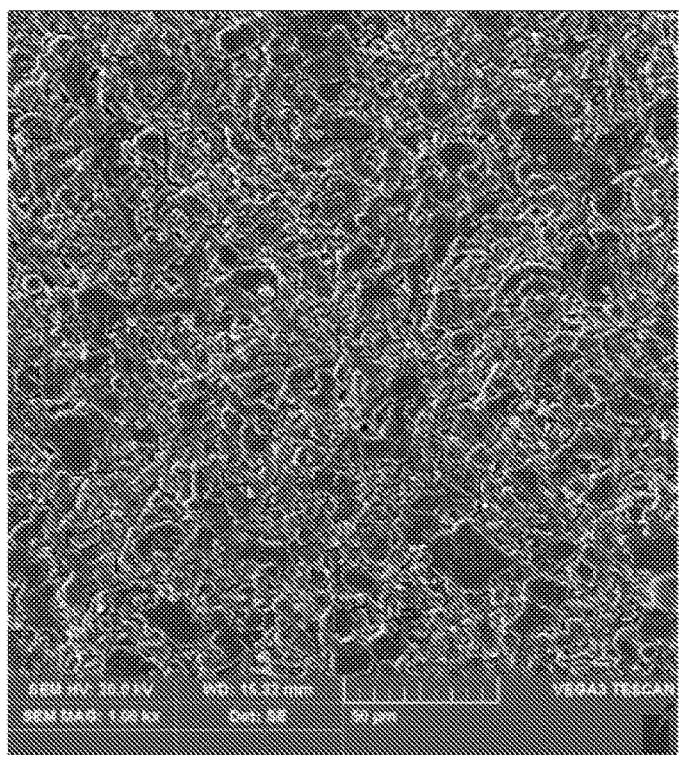
FIG. 11B is an SEM of the sample ZSF1.

FIG. 11A illustrates the magnetic permeability and loss vs. frequency for the sample ZSF1. FIG. 11B is an SEM image of the sample ZSF1. The permeability was around 7, while the magnetic loss tangent remained low with a value of 0.01 to 0.10 until a frequency of 1.0 GHz.

Figure 12A:
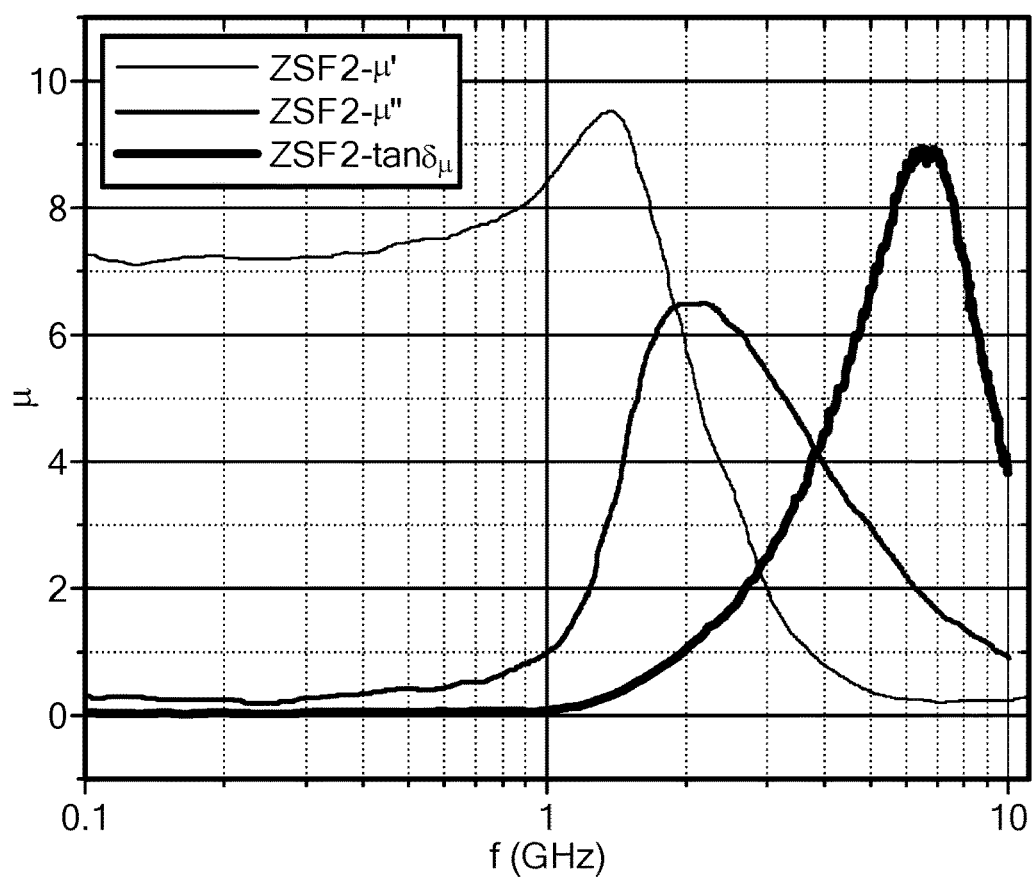
FIG. 12A is a graph of the frequency dependence of the magnetic permeability and loss for the sample ZSF2.
Figure 12B:
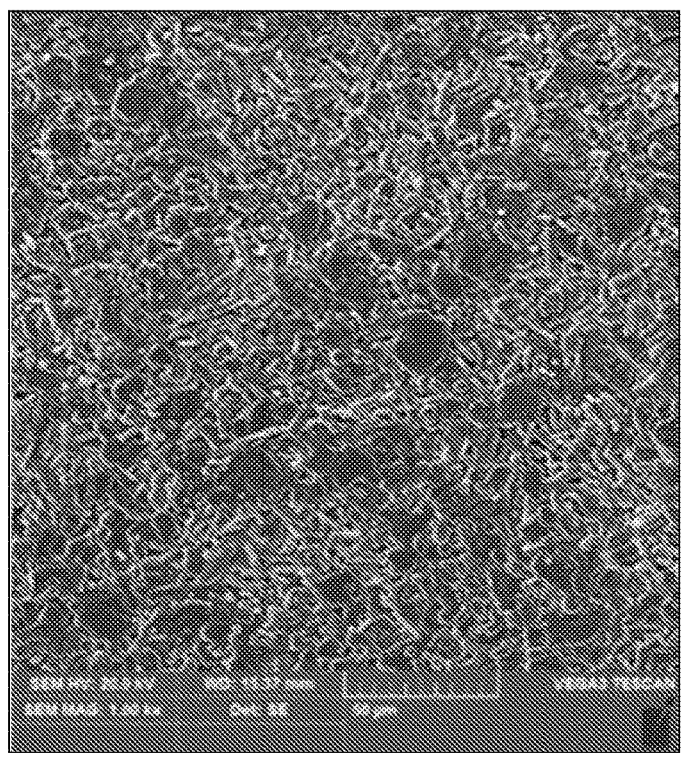
FIG. 12B is an SEM of the sample ZSF2.

FIG. 12A illustrates the magnetic permeability and loss vs. frequency for the sample ZSF2. FIG. 12B is an SEM image of the sample ZSF2. The permeability was around 7.5, while the magnetic loss tangent remained low with a value of 0.01 to 0.09 until a frequency of 1.0 GHz.

Figure 13A:
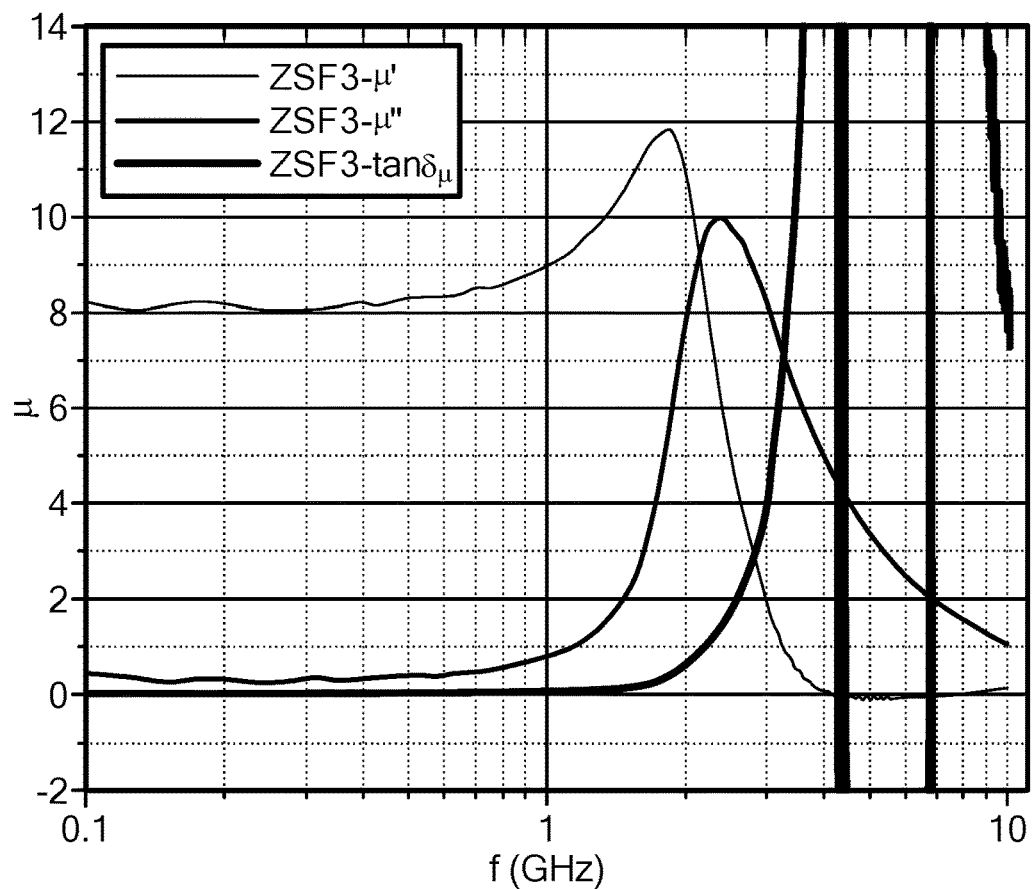
FIG. 13A is a graph of the frequency dependence of the magnetic permeability and loss for the sample ZSF3.
Figure 13B:
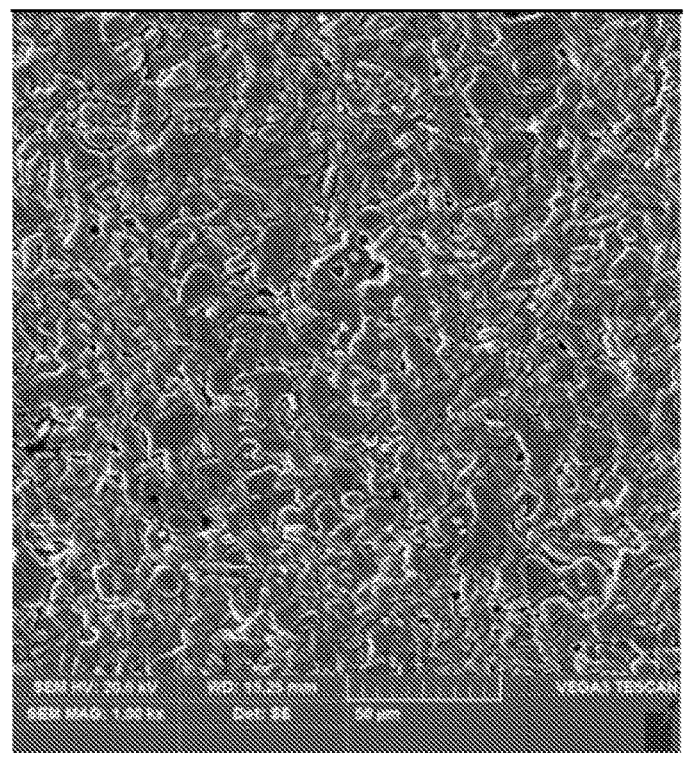
FIG. 13B is an SEM of the sample ZSF3.

FIG. 13A illustrates the magnetic permeability and loss vs. frequency for the sample ZSF3. FIG. 13B is an SEM image of the sample ZSF3. The permeability was around 8, while the magnetic loss tangent remained low with a value of 0.03 to 0.09 until a frequency of 1.0 GHz.

Figure 14A:
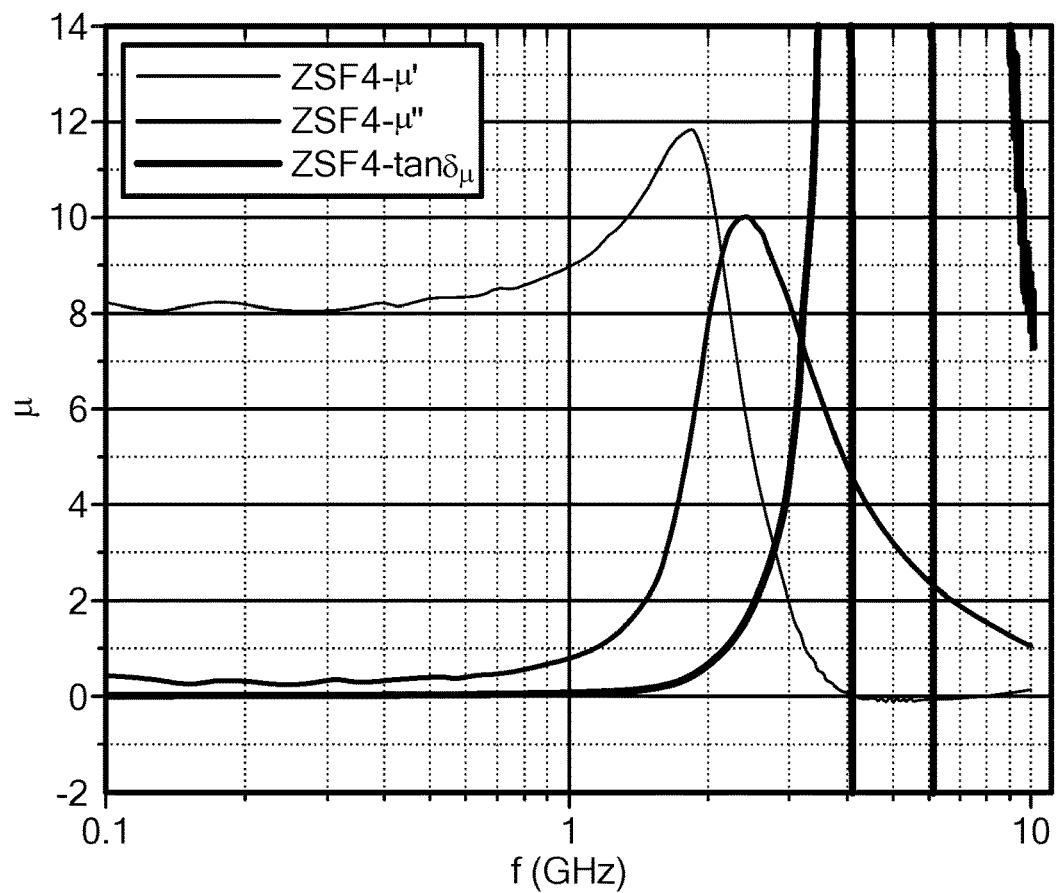
FIG. 14A is a graph of the frequency dependence of the magnetic permeability and loss for the sample ZSF4.
Figure 14B:
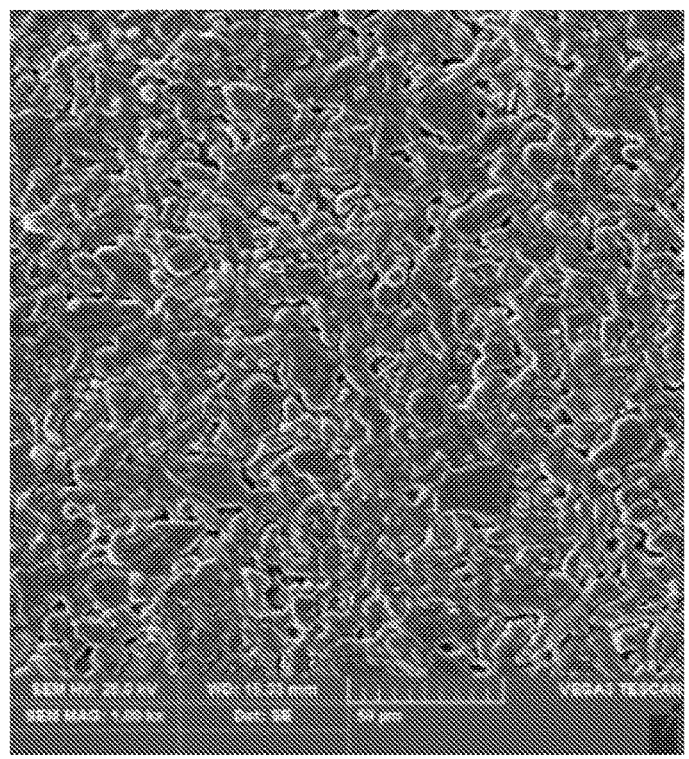
FIG. 14B is an SEM of the sample ZSF4.

FIG. 14A illustrates the magnetic permeability and loss vs. frequency for the sample ZSF4. The permeability was around 8, while magnetic loss tangent remained low with a value of 0.03 to 0.09 until a frequency of 1.0 GHz.

Figure 15:
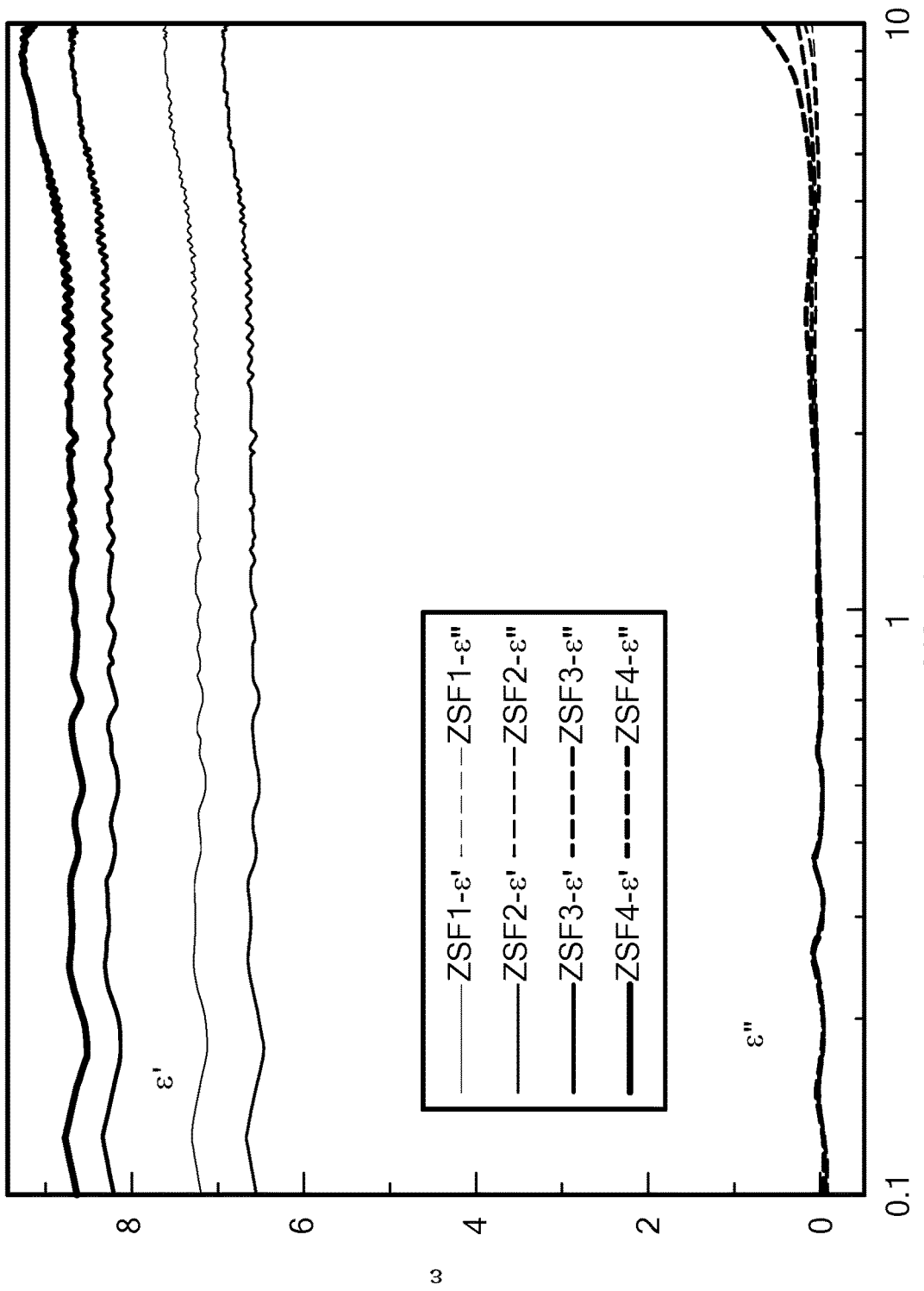
FIG. 15 is a graph of the dielectric spectra at 0.1 to 10.0 GHz for the samples ZSF1 through ZSF4.

FIG. 15 illustrates the dielectric spectra at 0.1 to 10.0 GHz for the samples ZSF1 to ZSF4. The dielectric constant range was 6.5 to 9.0, while the dielectric loss tangent was 0.001 to 0.01 over a frequency range of 0.1 to 10.0 GHz for all of the ZSF series samples.

Table 6 presents a summary of the results of real permittivity, real permeability, loss tangent, tan $\delta_\epsilon$, and loss tangent, tan $\delta_\mu$, for the four samples at two different frequencies 0.8 GHz and 1.0 GHz.

TABLE 6

Summary of the ZSF series samples

| Sample | f (GHz) | ε' | tan $\delta_\epsilon$ | μ' | tan $\delta_\mu$ | $f_r$ (GHz) | D (μm) |
|---|---|---|---|---|---|---|---|
| ZSF1 | 0.8 | 7.24 | 0.0019 | 7.63 | 0.0795 | 2.10 | 3-5 |
|  | 1.0 | 7.24 | 0.0025 | 8.10 | 0.11 |  | (big grain: 15-20) |

TABLE 6-continued

Summary of the ZSF series samples

| Sample | f (GHz) | ε' | tan $\delta_\epsilon$ | μ' | tan $\delta_\mu$ | $f_r$ (GHz) | D (μm) |
|---|---|---|---|---|---|---|---|
| ZSF2 | 0.8 | 6.60 | 0.0020 | 7.85 | 0.080 | 2.05 | 4-6 |
|  | 1.0 | 6.60 | 0.00247 | 8.37 | 0.118 |  | (big grain: 15-20) |
| ZSF3 | 0.8 | 8.25 | 0.0021 | 8.61 | 0.069 | 2.37 | 6-8 |
|  | 1.0 | 8.25 | 0.0027 | 9.00 | 0.091 |  | (big grain 15+) |
| ZSF4 | 0.8 | 8.67 | 0.0023 | 8.51 | 0.071 | 2.40 | 6 |
|  | 1.0 | 8.67 | 0.0028 | 8.88 | 0.091 |  | (big grain 15-20), uniform |

The best sample was ZSF4. It exhibited a high permeability, ε'=8.67, and low loss tangent, tan $\delta_\mu$=0.091, at 1.0 GHz, and a high cutoff frequency, $f_r$=2.40 GHz.

EXAMPLE 3

Polycrystalline $Co_2Z$ hexaferrites, having the composition $Sr_3Co_{2+x}Mo_xFe_{24-2x}O_{41}$, where x=0, 0.02, 0.05, 0.08, 0.10, 0.12, 0.15 and 0.20, were prepared by the two-step ceramic process described above in Example 1, using as starting materials $SrCO_3$, $MoO_2$, $Co_3O_4$, and $Fe_2O_3$.

Results
1. Magnetic Permeability Spectra and Magnetic Loss

Figure 16:
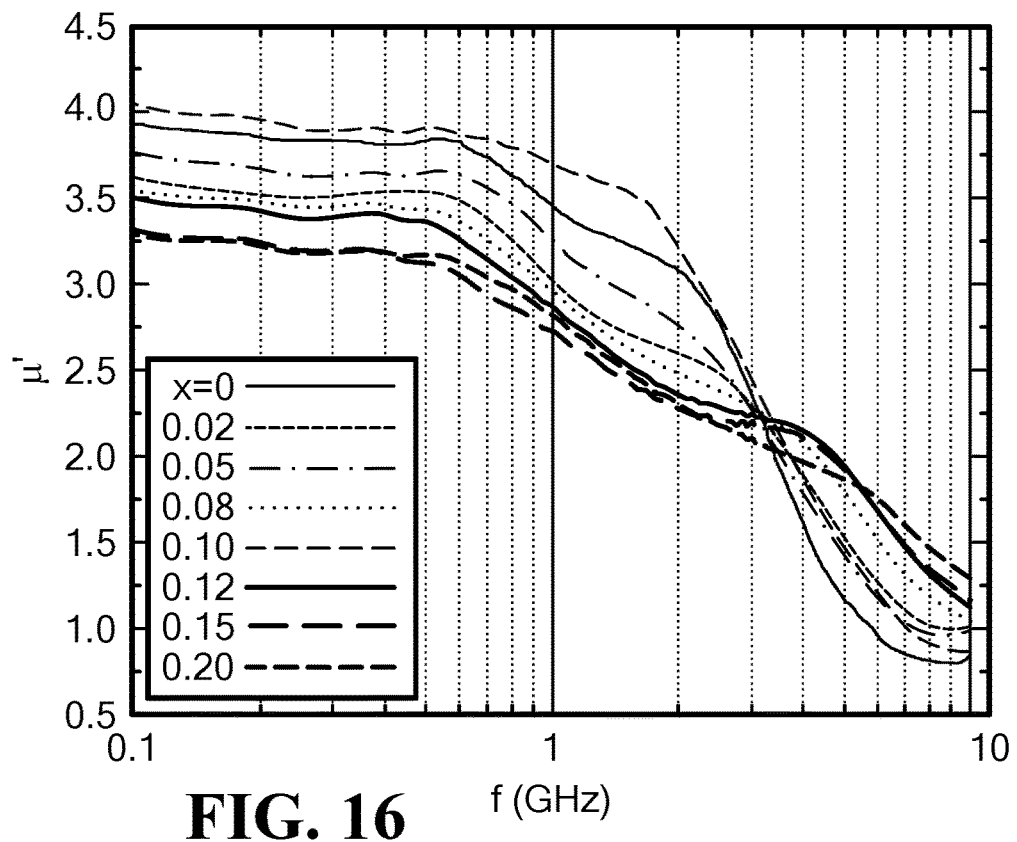
FIG. 16 is a graph of the frequency dependence of magnetic permeability for Mo-doped SrCo$_2$Z hexaferrites.
Figure 17:
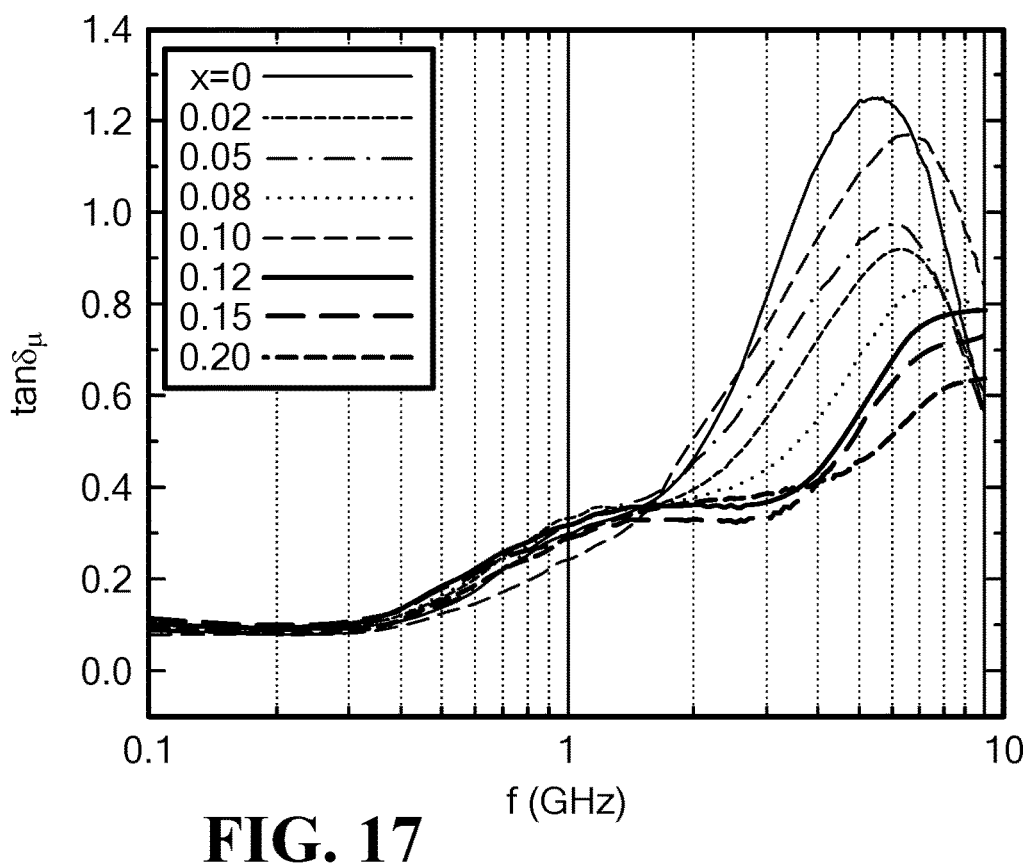
FIG. 17 is a graph of the frequency dependence of magnetic loss tangent for Mo-doped SrCo$_2$Z hexaferrites.

The permeability spectra were measured over frequencies of 0.1 to 10.0 GHz. The permeability exhibits a decrease from 3.8 to 3.3 at low frequency (0.1 GHz) with Mo content, except for a Mo content of x=0.10, as seen in FIG. 16. The Mo content gives rise to a shift of the loss tangent peak to higher frequencies above 5.0 GHz, as seen in FIG. 17. The Mo content x=0.10 results in a minimum loss tangent at the frequency range from 0.4 to 1.5 GHz, also seen in FIG. 17. That is, the loss tangent for x=0.20 is ~0.1 at 0.4 GHz and 0.4 at 1.5 GHz, which is the lowest loss among the Mo-doped $SrCo_2Z$ ferrites.

Figure 18:
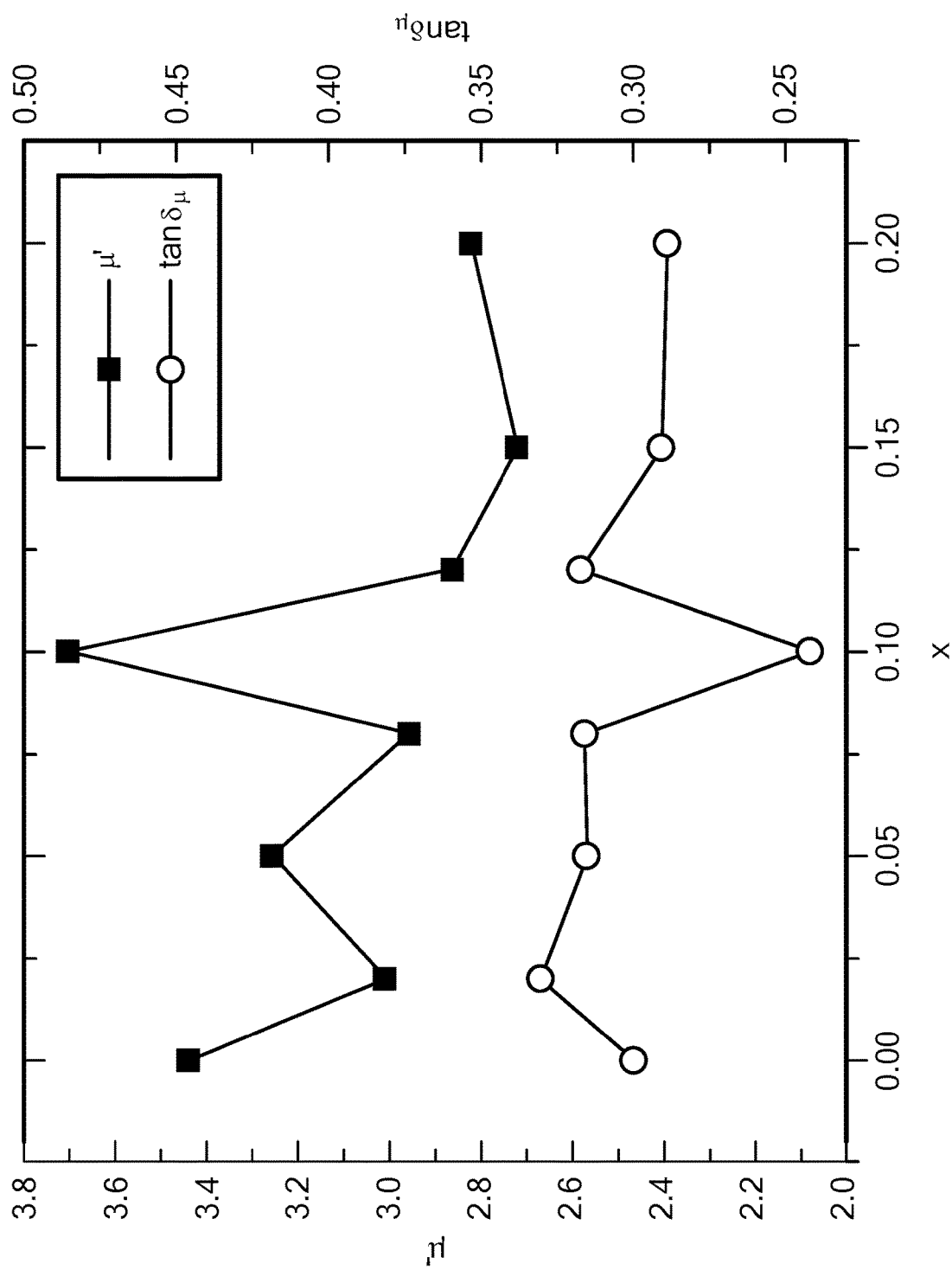
FIG. 18 is a graph of the variation of the permeability and magnetic loss tangent with Mo content at f=1.0 GHz for Mo-doped SrCo$_2$Z hexaferrites.
Figure 19:
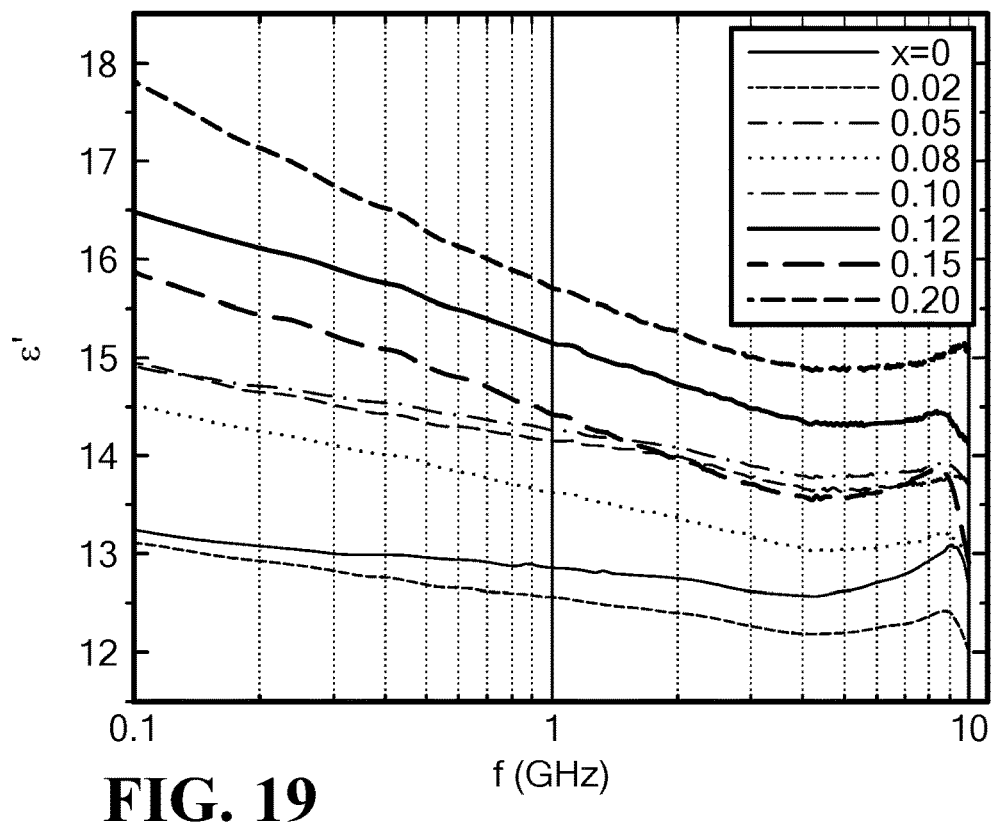
FIG. 19 is a graph of the frequency dependence of permittivity for Mo-doped SrCo$_2$Z hexaferrites.
Figure 20:
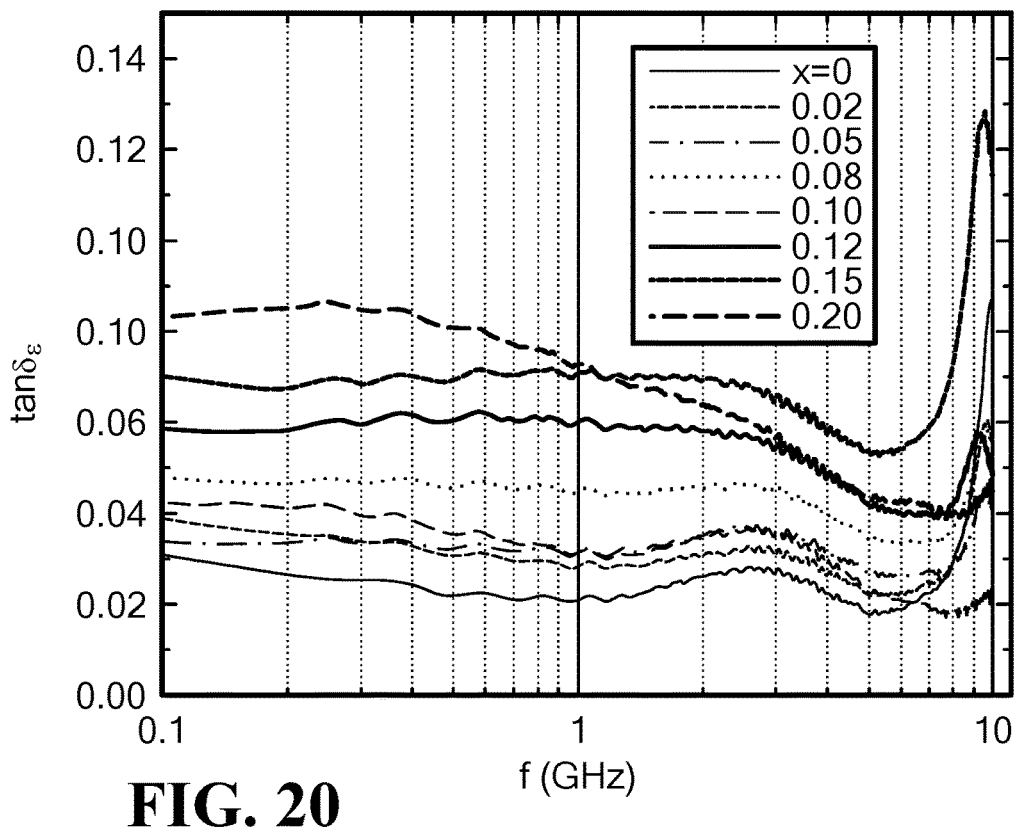
FIG. 20 is a graph of the frequency dependence of dielectric loss tangent for Mo-doped SrCo$_2$Z hexaferrites.

FIG. 18 illustrates the results of permeability and magnetic loss tangent for the Mo-doped $SrCo_2Z$ hexaferrites measured at 1.0 GHz. It can be seen that the sample with a Mo content of x=0.10 presents an increase in permeability of 15% and a decrease in magnetic loss of 15%. These results are similar to the results measured in $BaCo_2Z$ hexaferrites. It is noted that an optimized Mo-concentration in $SrCo_2Z$ hexaferrite is comparable to that of $BaCo_2Z$ hexaferrites.
2. Permittivity Spectra and Dielectric Loss The permittivity is basically proportional to the Mo content in $SrCo_2Z$ hexaferrites and decreases slightly for x=0.02, as seen in FIG. 19. The dielectric loss tangent increases from 0.03 to 0.08 with increasing Mo content (x=0 to 0.20), as seen in FIG. 20.

Figure 21:
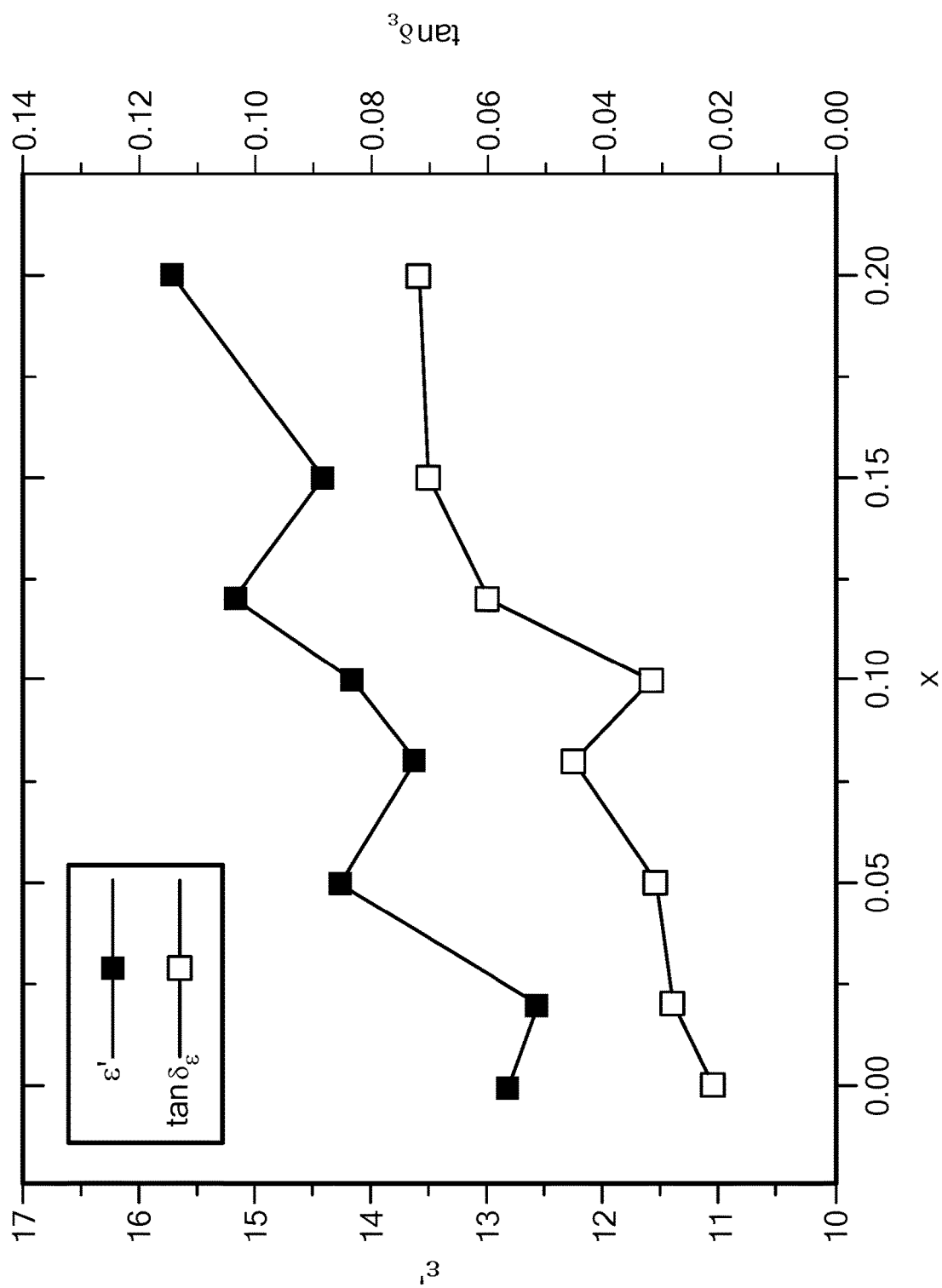
FIG. 21 is a graph of the variation of the permittivity and dielectric loss tangent for Mo content at 1.0 GHz for Mo-doped SrCo$_2$Z hexaferrites.
Figure 22A:
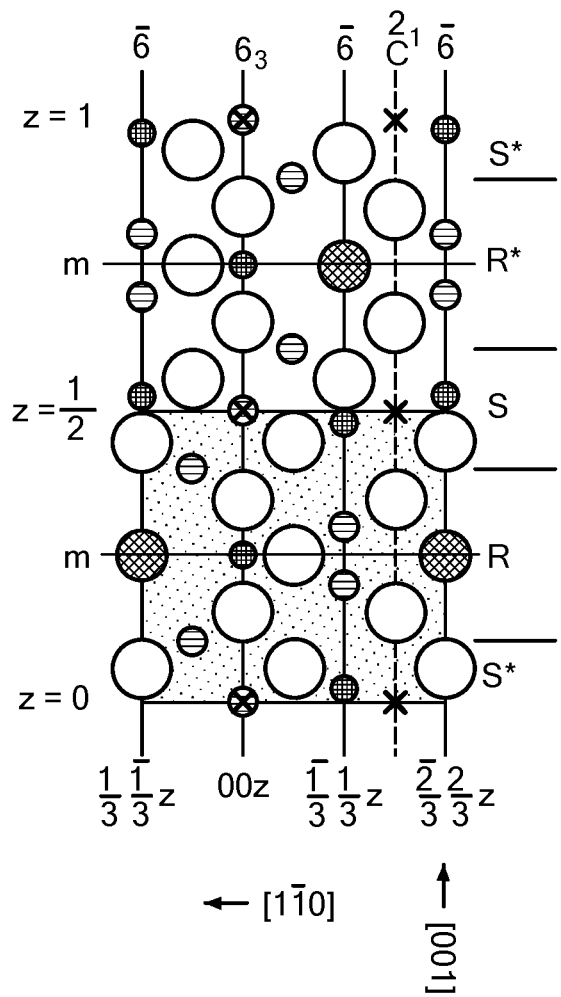
FIG. 22A is a schematic crystal structure diagram of an M-type hexaferrite.
Figure 22A:
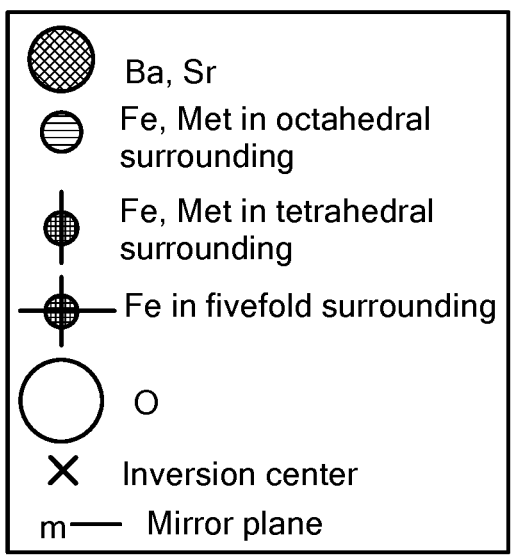
Figure 22B:
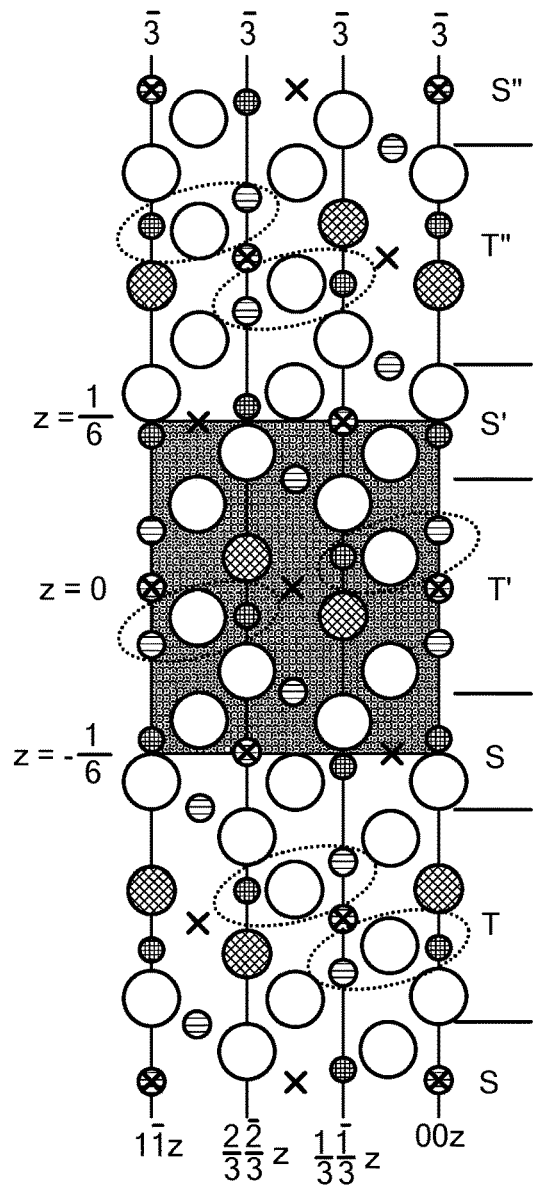
FIG. 22B is a schematic crystal structure diagram of a Z-type hexaferrite.
Figure 22C:
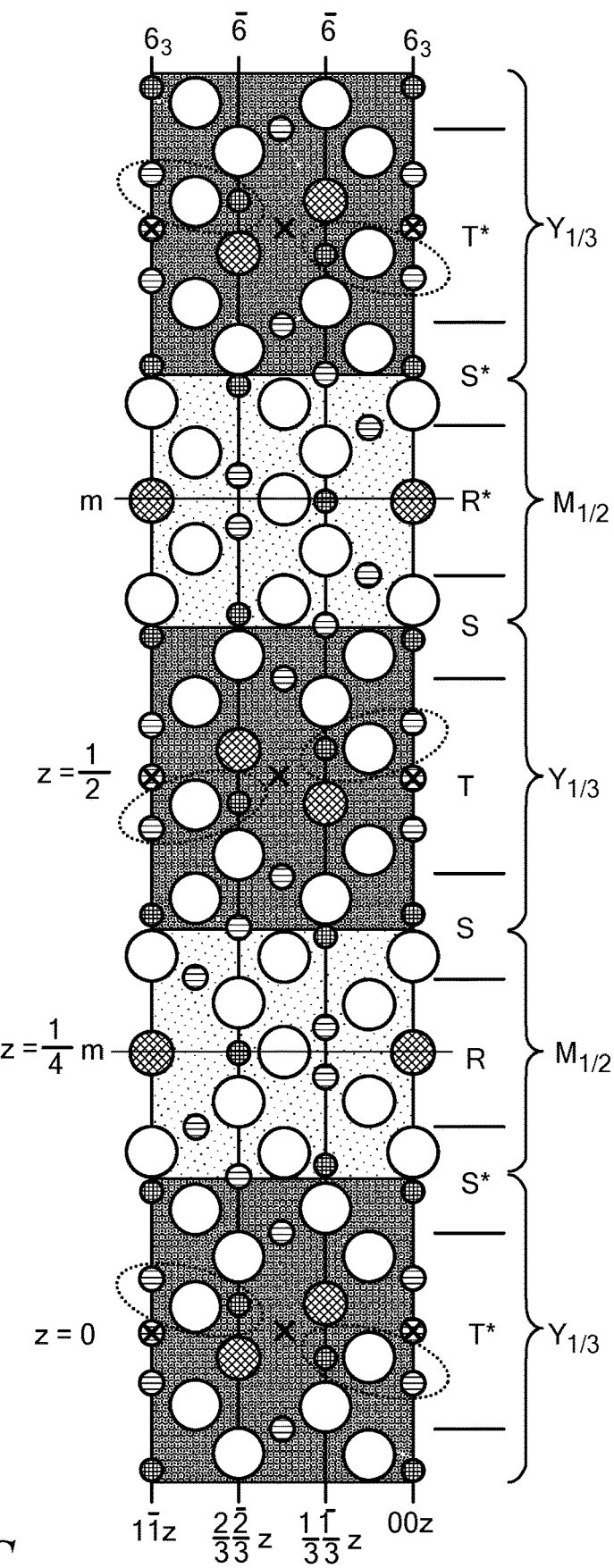
FIG. 22C is a schematic crystal structure diagram of a Y-type hexaferrite.

FIG. 21 depicts the permittivity and dielectric loss measured at 1.0 GHz, showing a dip of dielectric loss at x=0.10.
3. Magnetic and Dielectric Loss The lowest magnetic and dielectric loss in Mo-doped $SrCo_2Z$ hexaferrites were exhibited at a Mo content of x=0.10. At this Mo content, at f=1.0 GHz:

μ'=3.7 tan $\delta_\mu$=0.24

ε'=14.2; and tan $\delta_\epsilon$=0.03.

In summary, MoO$_2$ can suitably be used to reduce magnetic loss in SrCo$_2$Z hexaferrites.

As used herein, "consisting essentially of" allows the inclusion of materials or steps that do not materially affect the basic and novel characteristics of the claim. Any recitation herein of the term "comprising", particularly in a description of components of a composition or in a description of elements of a device, can be exchanged with "consisting essentially of" or "consisting of".

It will be appreciated that the various features of the embodiments described herein can be combined in a variety of ways. For example, a feature described in conjunction with one embodiment may be included in another embodiment even if not explicitly described in conjunction with that embodiment.

The present invention has been described in conjunction with certain preferred embodiments. It is to be understood that the invention is not limited to the exact details of construction, operation, exact materials or embodiments shown and described, and that various modifications, substitutions of equivalents, alterations to the compositions, and other changes to the embodiments disclosed herein will be apparent to one of skill in the art.

This application claims priority under 35 § 119(e) of U.S. Provisional Application No. 62/110,025 filed on Jan. 30, 2015, entitled "Low Cost, Low Loss and High Permeability MO—CO2Z Ferrites For UHF, L-Band and S-Band Applications", the disclosure of which is hereby incorporated by reference.

What is claimed is:

1. A hexaferrite composition comprising iron, cobalt, one or both of barium and strontium, and molybdenum, wherein said ferrite composition comprises a Z-type hexaferrite phase, having the formula $$(Ba_zSr_{(3-z)})Co_{(2+x)}Mo_xFe_{(y-2x)}O_{41}$$

where x=0.01 to 0.20;
y=20 to 24; and
z=0 to 3.

2. The hexaferrite composition of claim 1, wherein x=0.08 to 0.15.

3. The hexaferrite composition of claim 1, wherein x=0.10 to 0.12.

4. The hexaferrite composition of claim 1, wherein the hexaferrite composition has a real permeability at least 3.0 over a frequency range of 0.1 to 3.0 GHz.

5. The hexaferrite composition of claim 1, wherein the hexaferrite composition has a real permeability at least 7.0 over a frequency range of 0.1 to 3.0 GHz.

6. The hexaferrite composition of claim 1, wherein the hexaferrite composition has a real permeability ranging from 7.0 to 12.0 over a frequency range of 0.1 to 3.0 GHz.

7. The hexaferrite composition of claim 1, wherein z=1.2 to 3.0, and the hexaferrite composition has a real permeability ranging from 8.0 to 12.0 over a frequency range of about 0.1 GHz to at least 1.0 GHz.

8. The hexaferrite composition of claim 1, wherein z=0 to 0.5, and the hexaferrite composition has a real permeability ranging from 2.0 to 4.0 over a frequency range of about 0.1 GHz to about 3.0 GHz.

9. The hexaferrite composition of claim 1, wherein the hexaferrite composition has a real permittivity at least 6.0 over a frequency range of 0.1 to 3.0 GHz.

10. The hexaferrite composition of claim 1, wherein the hexaferrite composition has a real permittivity at least 8.0 over a frequency range of 0.1 to 3.0 GHz.

11. The hexaferrite composition of claim 1, wherein the hexaferrite composition has a real permittivity ranging from 6.0 to 18.0 over a frequency range of 0.1 to 10.0 GHz.

12. The hexaferrite composition of claim 1, wherein a real permittivity of the hexaferrite composition is equal to a real permeability of the hexaferrite composition within 10%.

13. The hexaferrite composition of claim 1, wherein the hexaferrite composition has a characteristic impedance matching an impedance of free space within 3%.

14. The hexaferrite composition of claim 1, wherein the hexaferrite composition has a dielectric loss tangent, tan $\delta_\epsilon$, less than 0.02 at a frequency of 0.1 to 0.8 GHz.

15. The hexaferrite composition of claim 1, wherein the hexaferrite composition has a dielectric loss tangent, tan $\delta_\epsilon$, less than 0.16 at a frequency of 0.1 to 1.0 GHz.

16. The hexaferrite composition of claim 1, wherein the hexaferrite composition has a magnetic loss tangent tan $\delta_\mu$ approximately 0.1 at 0.4 GHz.

17. The hexaferrite composition of claim 1, wherein the hexaferrite composition has a magnetic loss tangent tan $\delta_\mu$ less than 0.3 at a frequency of 0.1 to 0.8 GHz.

18. The hexaferrite composition of claim 1, wherein the hexaferrite composition has a magnetic loss tangent tan$\delta_\mu$ less than 0.95 at a frequency of 0.1 to 3.5 GHz.

19. The hexaferrite composition of claim 1, wherein the hexaferrite composition has a magnetic loss tangent, tan $\delta_\mu$, ranging from 0.1 to 1.0 over a frequency range of 0.1 to 1.0 GHz.

20. The hexaferrite composition of claim 1, wherein the hexaferrite composition has a dielectric loss factor tan $\delta_\epsilon/\epsilon'$ less than 0.001 at a frequency of 0.8 GHz.

21. The hexaferrite composition of claim 1, wherein the hexaferrite composition has a magnetic loss factor tan $\delta_\mu/\mu'$ less than 0.03 at a frequency of 0.8 GHz.

22. An article comprising the hexaferrite composition of claim 1.

23. The article of claim 22, wherein the article is an antenna, filter, inductor, circulator, or phase shifter.

24. The article of claim 22, wherein the article is a microwave antenna.

25. The article of claim 24, wherein the article is an antenna operable at a frequency equal to or greater than 0.1 GHz.

26. The article of claim 24, wherein the article is an antenna operable at a frequency equal to or greater than 0.3 GHz.

27. The article of claim 24, wherein the article is an antenna operable at 0.1 to 1.5 GHz.

28. The article of claim 24, wherein the article is an antenna operable at 0.3 to 1.0 GHz.

29. The article of claim 22, further comprising a second hexaferrite composition comprising a Z-type hexaferrite phase having the formula $$(Ba_zSr_{(3-z)})Co_{(2+x)}Mo_xFe_{(y-2x)}O_{41}$$

where x=0.01 to 0.20;
y=20 to 24; and
z=0 to 3; and
wherein the amount of Ba and the amount of Sr in the hexaferrite composition and the second hexaferrite composition differ.

30. The article of claim 29, wherein a cutoff frequency of the second hexaferrite composition is higher than a cutoff frequency of the hexaferrite composition.

31. The article of claim 29, wherein the hexaferrite composition has a real permeability ranging from 8.0 to 12.0 over a frequency range of about 0.1 GHz to at least 1.0 GHz, and the second hexaferrite composition has a real permeability ranging from 2.0 to 4.0 over a frequency range of about 0.1 GHz to about 3.0 GHz.

32. The article of claim 22, wherein the article is a giant magnetoresistant device or a giant tunneling magnetoresistant device.

33. A method of making a hexaferrite composition comprising:
  (a) providing hexaferrite phase precursor compounds comprising Fe, Ba, Co, and Mo,
  (b) calcining the hexaferrite phase precursor compounds in air to form a material comprising a Z-type hexaferrite phase.

34. The method of claim 33, wherein the hexaferrite phase precursor compounds comprise oxides of Fe, Ba, Co, and Mo.

35. The method of claim 33, wherein the hexaferrite phase precursor compounds comprise $MoO_2$, $BaCO_3$, $Co_3O_4$, and $Fe_2O_3$.

36. The method of claim 33, wherein the hexaferrite phase precursor compounds comprise 0 to 0.96 wt. % $MoO_2$, 22.10 to 22.18 wt. % $BaCO_3$, 6.02 to 6.59 wt. % $Co_3O_4$, and 70.35 to 71.8 wt. % $Fe_2O_3$.

37. The method of claim 33, wherein in step (b), the precursor compounds are calcined at 1000 to 1300° C.

38. The method of claim 33, further comprising:
  (c) crushing the material formed in step (b) to form a powder mixture, and
  (d) sintering the powder mixture.

39. The method of claim 38, wherein the powder mixture is sintered at 1200 to 1280° C. for 4 to 20 hours in an oxygen atmosphere.

40. The method of claim 38, further comprising forming the powder mixture into a compact prior to step (d).

41. The method of claim 38, further comprising adding a binder to the powder mixture.

42. The method of claim 41, wherein the binder is selected from the group consisting of a polyvinyl alcohol, methyl cellulose, polyethylene glycol, and poly(alkylene carbonate).

43. The method of claim 41, wherein the binder is polyvinyl alcohol comprising 8% to 12% by weight of the powder mixture.

44. The method of claim 38, further comprising:
  (e) crushing the material formed in step (d) to form a powder mixture; and
  (f) annealing the powder mixture formed in step (e).

45. The method of claim 44, wherein the powder mixture is annealed at 800 to 1000° C. for 9 to 20 hours.

46. The hexaferrite composition of claim 1, wherein x=0.08 to 0.15; and
the hexaferrite composition has
  a real permeability at least 3.0 over a frequency range of 0.1 to 3.0 GHz,
  a real permittivity at least 6.0 over a frequency range of 0.1 to 3.0 GHz,
  a dielectric loss tangent, tan $\delta_\epsilon$, less than 0.16 at a frequency of 0.1 to 0.8 GHz, and
  a magnetic loss factor tan $\delta_\mu/\mu'$ less than 0.03 at a frequency of 0.8 GHz.

47. The hexaferrite composition of claim 46, wherein z=0 to 0.5, and
the hexaferrite composition has a real permeability ranging from 3.0 to 4.0 over a frequency range of about 0.1 GHz to about 3.0 GHz.

48. The hexaferrite composition of claim 1, wherein x=0.10 to 0.12; and
the hexaferrite composition has
  a real permeability at least 7.0 over a frequency range of 0.1 to 3.0 GHz,
  a real permittivity at least 8.0 over a frequency range of 0.1 to 3.0 GHz,
  a dielectric loss tangent, tan $\delta_\epsilon$, less than 0.02 at a frequency of 0.1 to 1.0 GHz, and
  a dielectric loss factor tan $\delta_\epsilon/\epsilon'$ less than 0.001 at a frequency of 0.8 GHz.

49. The hexaferrite composition of claim 48, wherein z=1.2 to 3.0, and
the hexaferrite composition has a real permeability ranging from 8.0 to 12.0 over a frequency range of about 0.1 GHz to at least 1.0 GHz.

50. An article comprising the hexaferrite composition of claim 46, wherein the article is an antenna, filter, inductor, circulator, or phase shifter.

51. An article comprising the hexaferrite composition of claim 48, wherein the article is an antenna, filter, inductor, circulator, or phase shifter.

52. A method of making a hexaferrite composition comprising:
  (a) providing hexaferrite phase precursor compounds comprising more than 0 to 0.96 wt. % $MoO_2$, 22.10 to 22.18 wt. % $BaCO_3$, 6.02 to 6.59 wt. % $Co_3O_4$, and 70.35 to 71.8 wt. % $Fe_2O_3$,
  (b) calcining the hexaferrite phase precursor compounds at 1000 to 1300° C. in air to form a material comprising a Z-type hexaferrite phase;
  (c) crushing the material formed in step (b) to form a powder mixture, forming the powder mixture and a binder into a compact, and
  (d) sintering the compact at 1200 to 1280° C. for 4 to 20 hours in an oxygen atmosphere.
  (e) crushing the material formed in step (d) to form a second powder mixture; and
  (f) annealing the second powder mixture formed in step (e) at 800 to 1000° C. for 9 to 20 hours.

* * * * *